United States Patent
Heo et al.

(10) Patent No.: US 10,379,543 B2
(45) Date of Patent: Aug. 13, 2019

(54) VEHICLE AND CONTROL METHOD THEREOF AND AUTONOMOUS DRIVING SYSTEM USING THE SAME

(71) Applicants: Hyundai Motor Company, Seoul (KR); Kia Motors Corporation, Seoul (KR)

(72) Inventors: MyungSeon Heo, Seoul (KR); Byungyong You, Suwon-si (KR); Kicheol Shin, Seongnam-si (KR); Youngchul Oh, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 137 days.

(21) Appl. No.: 15/645,669

(22) Filed: Jul. 10, 2017

(65) Prior Publication Data
US 2018/0259972 A1    Sep. 13, 2018

(30) Foreign Application Priority Data
Mar. 7, 2017  (KR) .................. 10-2017-0028771

(51) Int. Cl.
*G05D 1/02* (2006.01)
*B60W 30/00* (2006.01)

(52) U.S. Cl.
CPC .......... *G05D 1/0274* (2013.01); *B60W 30/00* (2013.01); *G05D 1/024* (2013.01); *G05D 1/0248* (2013.01); *G05D 1/0278* (2013.01); *G05D 2201/0213* (2013.01)

(58) Field of Classification Search
CPC .. G05D 1/0274; G05D 1/0248; G05D 1/0278; G05D 2201/0213
See application file for complete search history.

(56) References Cited

U.S. PATENT DOCUMENTS

| | | | |
|---|---|---|---|
| 9,199,668 B2 * | 12/2015 | Zeng | B62D 15/0265 |
| 9,816,823 B2 * | 11/2017 | Wang | G01C 21/32 |
| 9,953,535 B1 * | 4/2018 | Canavor | H04W 4/70 |
| 2006/0212279 A1 * | 9/2006 | Goldberg | G06N 3/126 |
| | | | 703/2 |
| 2006/0217884 A1 * | 9/2006 | Adachi | G01C 21/30 |
| | | | 701/414 |
| 2010/0002911 A1 * | 1/2010 | Wu | B60W 30/12 |
| | | | 382/104 |
| 2012/0095682 A1 * | 4/2012 | Wilson | G01C 21/32 |
| | | | 701/532 |

(Continued)

FOREIGN PATENT DOCUMENTS

| | | |
|---|---|---|
| JP | 2006-215860 A | 8/2006 |
| JP | 2007-183432 A | 7/2007 |

(Continued)

*Primary Examiner* — Sze-Hon Kong
(74) *Attorney, Agent, or Firm* — Morgan, Lewis & Bockius LLP

(57) ABSTRACT

A vehicle, a control method thereof, and an autonomous driving system using the same, may include a vehicle detector configured to detected driving environment information about surroundings of a vehicle, and a controller configured to generate a map including at least one of a surrounding terrain, a lane, and a traveling route based on the detected driving environment information.

14 Claims, 25 Drawing Sheets

(56) References Cited

U.S. PATENT DOCUMENTS

| | | | | |
|---|---|---|---|---|
| 2013/0002470 | A1* | 1/2013 | Kambe | G01S 13/867 |
| | | | | 342/55 |
| 2016/0312599 | A1* | 10/2016 | Adam | E21B 43/00 |
| 2017/0267237 | A1* | 9/2017 | Oyama | B60W 30/12 |
| 2017/0307398 | A1* | 10/2017 | Iwaasa | G01C 21/32 |
| 2018/0045517 | A1* | 2/2018 | Ahuja | G01C 21/30 |
| 2018/0056992 | A1* | 3/2018 | Sogen | G06F 16/29 |
| 2018/0061226 | A1* | 3/2018 | Thelen | G01C 21/32 |
| 2018/0086373 | A1* | 3/2018 | Tamura | B62D 6/006 |
| 2018/0113474 | A1* | 4/2018 | Koda | G08G 1/09 |
| 2018/0151066 | A1* | 5/2018 | Oba | G08G 1/096725 |
| 2018/0216942 | A1* | 8/2018 | Wang | G01C 21/32 |
| 2018/0217603 | A1* | 8/2018 | Kwon | G05D 1/0214 |
| 2018/0245929 | A1* | 8/2018 | Watanabe | H04W 4/40 |
| 2019/0003838 | A1* | 1/2019 | Kudrynski | G06T 7/55 |

FOREIGN PATENT DOCUMENTS

| | | |
|---|---|---|
| JP | 2011-076559 A | 4/2011 |
| KR | 10-2004-0093564 A | 11/2004 |
| KR | 10-0823739 B1 | 4/2008 |
| KR | 10-2010-0020054 A | 2/2010 |
| KR | 10-1458502 B1 | 11/2014 |

* cited by examiner

VEHICLE AND CONTROL METHOD THEREOF AND AUTONOMOUS DRIVING SYSTEM USING THE SAME

CROSS-REFERENCE TO RELATED APPLICATION

The present application claims priority to Korean Patent Application No. 10-2017-0028771, filed on Mar. 7, 2017, the entire contents of which is incorporated herein for all purposes by this reference.

BACKGROUND OF THE INVENTION

Field of the Invention

The present invention relates to a vehicle, a control method thereof, and an autonomous driving system using the same.

Description of Related Art

In general, there is an increasing trend in the vehicle industry for developing and various vehicle additional service devices in consideration of the convenience and safety of the driver.

More particularly, the vehicle additional service device includes a safety assisting device, such as a lane departure warning device for preventing a driver from moving out of a lane during driving of the vehicle by assisting a driver's steering operation, and navigation device for providing a route to a destination and surrounding information along the route.

In addition, there has been a technique of utilizing a detector mounted on a vehicle configured to recognize a terrain object (e.g., landscape) or a lane, which is immobile, around the vehicle, and apply the recognized information to an autonomous driving.

A method of manufacturing a map for the autonomous vehicle driving includes scanning a surrounding terrain using a vehicle provided with a Mobile Mapping System (MMS), and processing three-dimensional (3D) data through the scanned surrounding terrain to generate a precise map.

However, the above-described map generation method requires separate equipment for map production, a long processing time, and has a low accuracy in position detection due to a difficulty in reflecting detector characteristics of an autonomous vehicle to which the measured data is applied.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle, a control method thereof, and an autonomous driving system configured for generating a map by use of data detected through an autonomous driving vehicle, and automatically updating the map according to a change of the map.

Additional aspects of the invention will be set forth in part in the description which follows and, in part, will be obvious from the description, or may be learned by practice of the invention.

In accordance with an aspect of the present invention, a vehicle includes a vehicle detector configured to detect driving environment information about the surroundings of a vehicle, and a controller configured to generate a map including at least one of a surrounding terrain, a lane, and a traveling route based on the detected driving environment information.

The controller may generate the surrounding terrain by extracting effective detector data from detector data detected through the vehicle detector among the driving environment information, clustering the extracted effective detector data, and extracting a line.

The controller may extract a linear lane by dividing portions using a curvature change based on a constant term of a quadratic equation or cubic equation and a vehicle driving trajectory detected from the driving environment information, and using a coefficient value of a linear term of the quadratic equation or cubic equation obtained by converting the vehicle driving trajectory of each portion into a quadratic curve.

The controller may extract a driving trajectory by rearranging the vehicle driving trajectory detected from the driving environment information at regular intervals.

When the map is generated, the controller is configured to use driving environment information corresponding to a predetermined distance and a predetermined range of angles with respect to a position of the vehicle among the driving environment information.

The vehicle may further include a storage configured to store the map, wherein the controller is configured to store the map generated at each driving of the vehicle in the storage as a temporary map, compare the temporary map with a current map presently applied to the vehicle, and updates the temporary map to a new current map when a difference between the temporary map and the current map exists.

The controller may update the temporary map to the new current map when a number of times a main item of the temporary map is repeatedly measured is equal to or greater than a predetermined number of times and a difference between the temporary map and the current map exists, or when a difference between the temporary map and the current map exists in an area where an autonomous driving fails or a number of intervention times of a driver is equal to or greater than a reference value.

When the temporary map is updated to the new current map, the controller is configured to assign an identification number to a conventional current map, and back up the existing current map in the storage.

The controller may restore the current map to a most recent map among the maps backed up in the storage when an area in which an autonomous driving fails or a number of intervention times of a driver is equal to or greater than a reference value is a map update zone.

The vehicle detector includes a LiDAR detector, a camera, and a global positioning system (GPS) detector.

In accordance with an aspect of the present invention, a control method of controlling a vehicle includes detecting driving environment information about surroundings of a vehicle through a vehicle detector, generating a map including at least one of a surrounding terrain, a lane and a traveling route based on the detected driving environment information, and storing the generated map as a temporary map, comparing the temporary map with a current map presently applied to the vehicle, and updating the temporary map to a new current map when a difference between the temporary map and the current map exists.

The generating and storing of the map may include extracting effective detector data from detector data detected through the vehicle detector among the driving environment information, clustering the extracted effective detector data, extracting a main straight line from the clustered effective detector data and generating the surrounding terrain by extracting a surrounding line adjacent to the main straight line.

The generating and storing of the map may include extracting a constant term of a quadratic equation or cubic equation detected from the driving environment information, dividing portions by use of a curvature change based on a vehicle driving trajectory, and extracting a coefficient value of a linear term of the quadratic equation or cubic equation obtained by converting the vehicle driving trajectory of each portion into a quadratic curve, and generating a linear lane by use of the constant term and the coefficient value of the linear term.

The generating and storing of the map includes extracting a driving trajectory by rearranging a vehicle driving trajectory detected from the driving environment information at regular intervals.

The map is generated by use of driving environment information corresponding to a predetermined distance and a predetermined range of angles with respect to a position of the vehicle among the driving environment information.

The updating of the temporary map to a new current map when a difference between the temporary map and the current map exists may include updating the temporary map to the new current map when a number of times a main item of the temporary map is repeatedly measured is equal to or greater than a predetermined number of times and a difference between the temporary map and the current map exists, or when a difference between the temporary map and the current map exists in an area where an autonomous driving fails or a number of intervention times of a driver is equal to or greater than a reference value.

The updating of the temporary map to a new current map includes assigning an identification number to a conventional current map, and backing up the existing current map.

The method further includes after the updating of the temporary map to a new current map, restoring the current map to a most recent map among the backed-up maps when an area in which an autonomous driving fails or a number of intervention times of a driver is equal to or greater than a reference value is a map update zone.

In accordance with an aspect of the present invention, an autonomous driving system may include a vehicle configured to detect driving environment information about the surroundings of the vehicle through a vehicle detector and to generate a map including at least one of a surrounding terrain, a lane, and a traveling route based on the detected driving environment information, and an autonomous driving management server configured to store the map transmitted from the vehicle as a temporary map, compare the temporary map transmitted from the vehicle with a current map presently applied to the vehicle at each time of the vehicle travelling, and when a difference between the temporary map and the current map exists, transmit the temporary map to the vehicle for the temporary map to be updated to a new current map.

The vehicle is configured to use driving environment information corresponding to a predetermined distance and a predetermined range of angles with respect to a position of the vehicle among the driving environment information.

The autonomous driving management server is configured to update the temporary map to the new current map when a number of times a main item of the temporary map is repeatedly measured is equal to or greater than a predetermined number of times and a difference between the temporary map and the current map exists, or when a difference between the temporary map and the current map exists in an area where an autonomous driving fails or a number of intervention times of a driver is equal to or greater than a reference value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
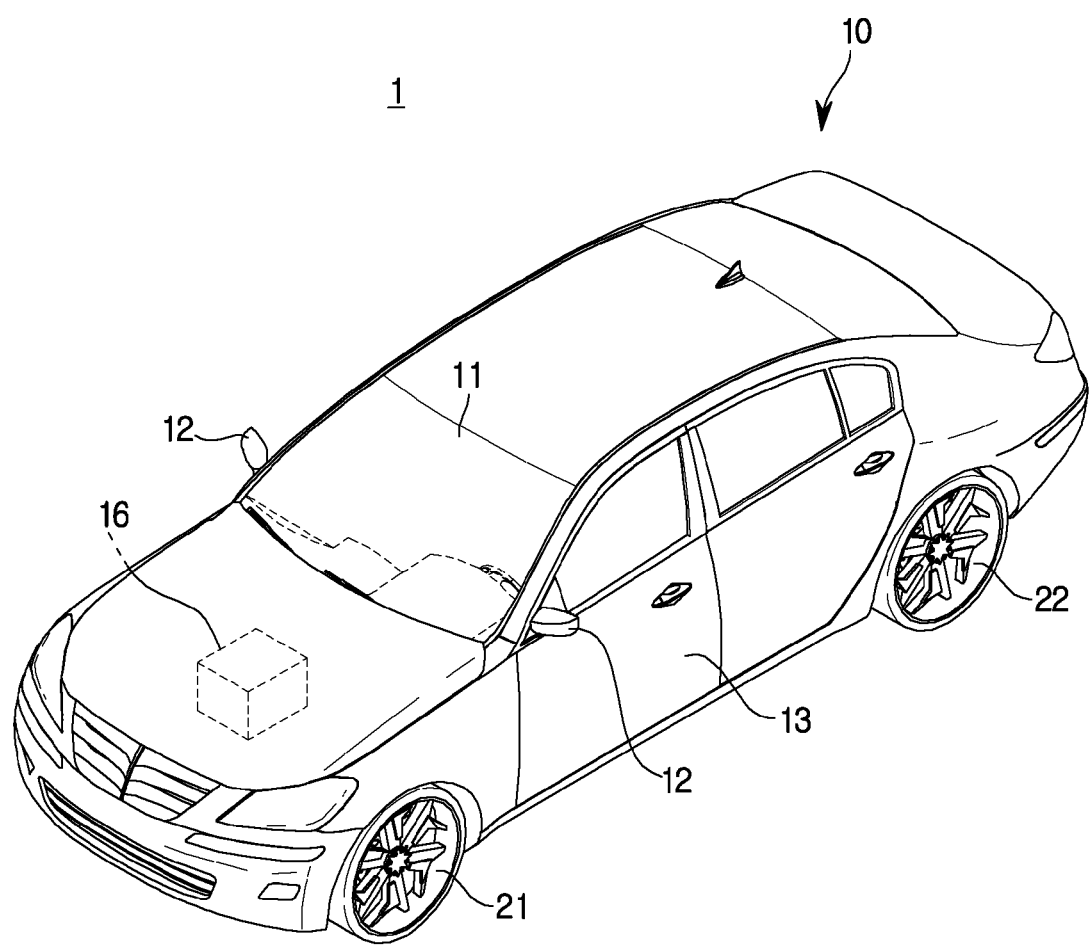
FIG. 1 is a diagram illustrating the external of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Not all elements of embodiments of the present invention will be described, and description of what are commonly known in the art or what overlap each other in the exemplary embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or portions should not be limited by these terms. These terms are only used to distinguish an element, component, region, layer or portion from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the present invention will now be described with reference to accompanying drawings.

FIG. 1 is a diagram illustrating the external of a vehicle.

Referring to FIG. 1, in various exemplary embodiments, a vehicle 1 is provided at an external thereof with a main body 10 constituting the external of the vehicle 1, a windscreen 11 providing a driver with a view ahead of the vehicle 1, side mirrors 12 providing a driver with a view behind the vehicle 1, doors 13 shielding the internal of the vehicle 1 from outside, and wheels 21 and 22 moving the vehicle 1 which include front wheels 21 located in the front portion of the vehicle 1 and rear wheels 22 located in the rear portion of the vehicle 1.

The windscreen 11 is provided on an upper front side of the main body 10 wherein the driver obtains views ahead of the vehicle 1. The side mirrors 12 include a left side mirror and a right side mirror disposed on the left and right sides of the main body 10, respectively, wherein the driver obtains views behind and beside of the vehicle 1.

The doors 13 are rotatably disposed on the left and right sides of the main body 10, wherein, when opened, the driver and passenger get in or get out of the vehicle 1 and when closed, the inside of the vehicle 1 is shielded from outside.

In various exemplary embodiments, the vehicle 1 includes a power apparatus 16 that rotates the wheels 21 and 22, a steering apparatus that changes a moving direction of the vehicle 1, and a braking apparatus that stops the movement of the wheels.

The power apparatus 16 provides a rotary power to the front or rear wheels 21 or 22 to move the main body 10 forward or backward thereof. The power apparatus 16 may include an engine that produces a rotary power by burning a fuel or a motor that produces a rotary power from electrical power supplied from a condenser.

In various exemplary embodiments, the steering apparatus includes a steering handle 42 (see FIG. 2) manipulated by the driver for controlling a driving direction, a steering gear converting a rotary motion of the steering handle 42 to a reciprocating motion, and a steering link transferring the reciprocating motion of the steering gear to the front wheels 21. The steering system changes the moving direction of the vehicle 1 by changing the direction of the rotation axis of the wheels.

In various exemplary embodiments, the braking apparatus includes a brake pedal manipulated by the driver for a braking operation, a brake drum coupled to the wheels 21 and 22, and a brake shoe braking the rotation of the brake drum by use of a friction force. The braking apparatus brakes driving of the vehicle 1 by stopping the rotation of the wheels 21 and 22.

Figure 2:
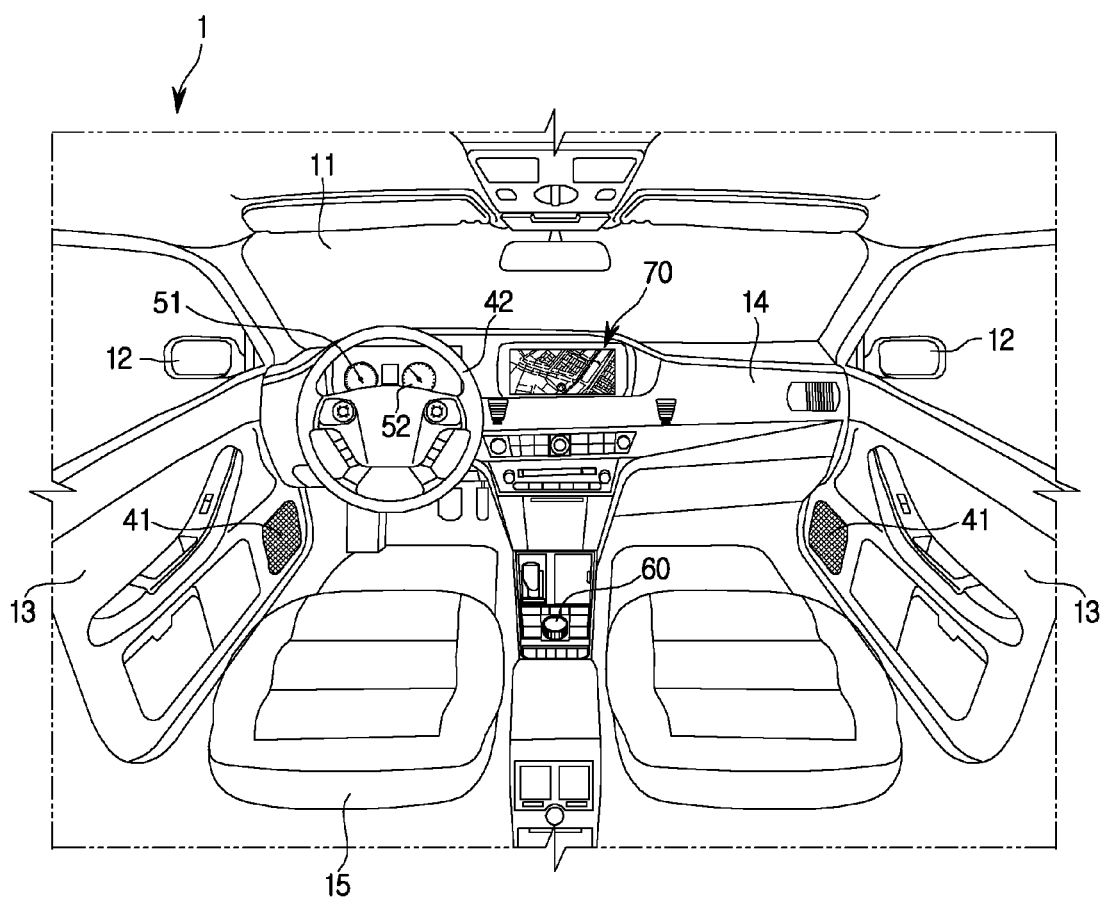
FIG. 2 is a diagram illustrating the internal of a vehicle according to an exemplary embodiment of the present invention.

FIG. 2 is a diagram illustrating the internal of a vehicle 1.

In various exemplary embodiments, the vehicle 1 is provided with an internal thereof with a dashboard 14 on which various systems are disposed for the driver to manipulate the vehicle 1, a driver seat 15 seating the driver thereon, cluster indicators 51 and 52 indicating information about an operation of the vehicle 1, and a navigation system 70 providing a route guidance are configured to give directions and audio and video functions in response to a manipulation instruction from the driver.

In various exemplary embodiments, the dashboard 14 protrudes toward the driver from a lower portion of the windscreen 11 allowing the driver to manipulate the various systems disposed on the dashboard 14 while looking forward thereof.

The driver seat 15 is located at a rear side of the dashboard 14, allowing the driver to operate the vehicle 1 while keeping his or her eyes on the road ahead of the vehicle 1 and various systems on the dashboard in a comfortable position.

In various exemplary embodiments, the cluster indicators 51 and 52 are disposed on the dashboard 14 to face the driver seat 15, and may include a speed gage 51 indicating the current driving speed of the vehicle 1 and an RPM gauge 52 indicating revolutions per minute of the power apparatus.

In various exemplary embodiments, the navigation system 70 includes a display displaying information about a road on which the vehicle 1 is traveling or a route to a destination intended by the driver, and a speaker 41 producing sound according to a manipulation command of the driver. Recently, there is a trend to provide an audio video navigation (AVN) system, in which audio and video players and a navigation system are incorporated, on the vehicle.

In various exemplary embodiments, the navigation system 70 is disposed on the center fascia. The center fascia refers to a control panel portion located on the dashboard 14 between the driver and passenger seats, where the dashboard 14 and a shift lever join in the vertical direction thereof, having the navigation system 70, an air conditioner, a heater controller, a vent, a cigar jack and ash tray, a cup holder, etc., disposed therein. The center fascia is also configured to draw a line between the driver seat and the passenger seat along with a center console.

Furthermore, a jog dial 60 may be provided to manipulate operation of various systems, including the navigation system 70.

In an exemplary embodiment of the present invention, the jog dial 60 may manipulate the operation by being turned or pressed, and may also include a touch pad having a touch recognition are configured to recognize handwriting through the user's finger or a touch recognition tool for operation manipulation.

The vehicle, to be described below, represents an autonomous driving vehicle having an autonomous drive function, and for convenience of explanation, will be referred to as a vehicle henceforth.

Figure 3:
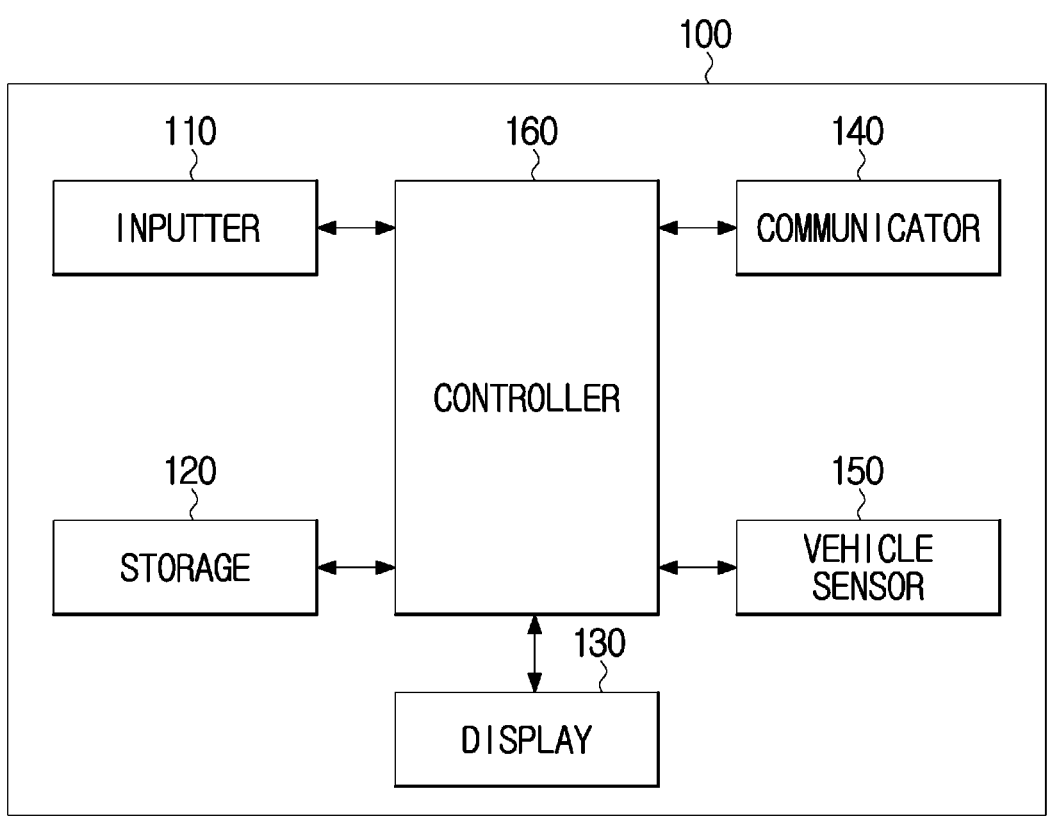
FIG. 3 is a control block diagram illustrating details of the configuration of a vehicle according to an exemplary embodiment of the present invention.

FIG. 3 is a control block diagram illustrating details of the configuration of a vehicle.

Figure 17:
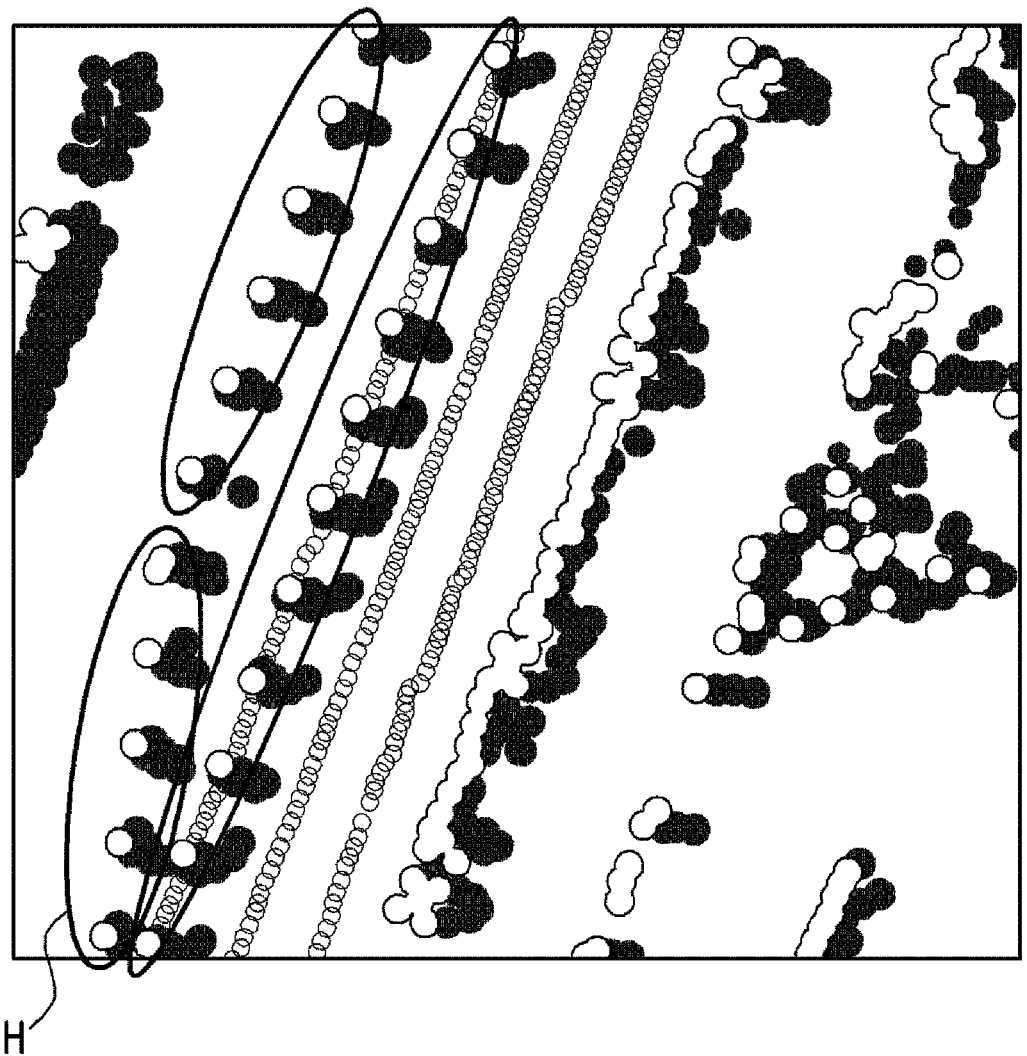
Figure 18:
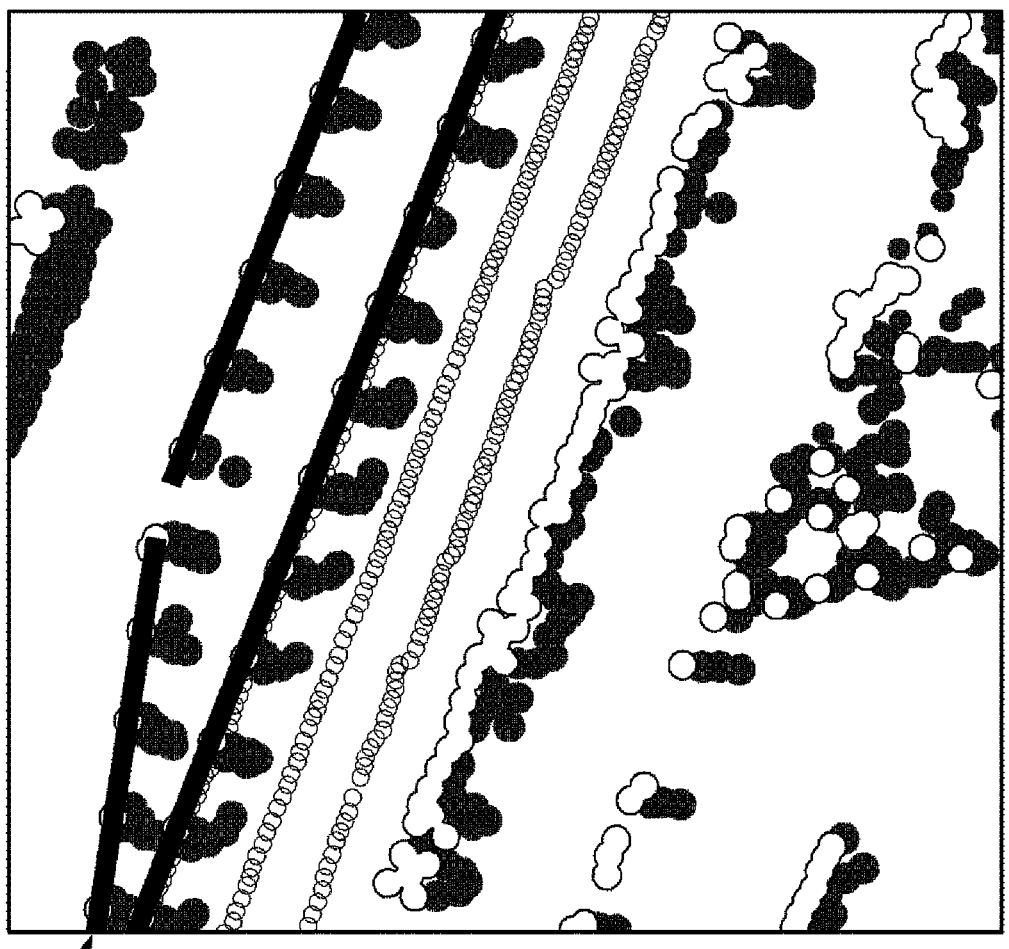
Figure 19:
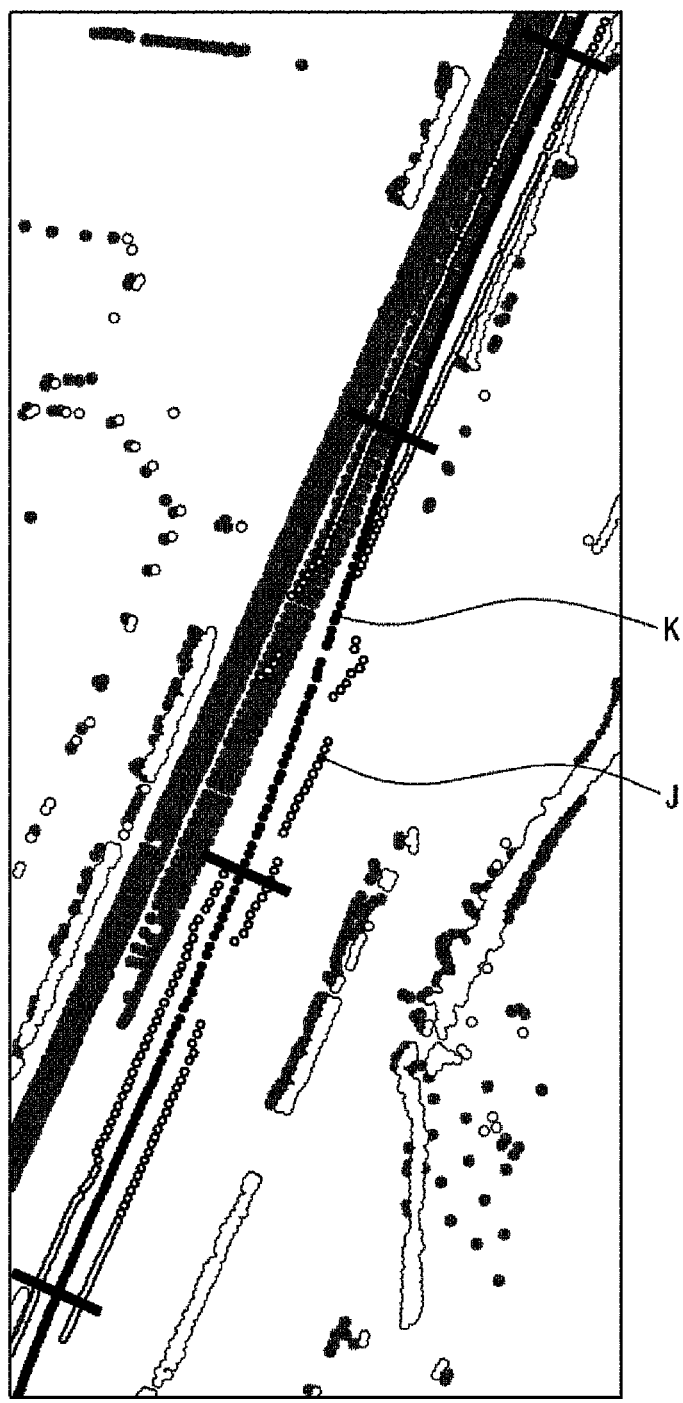
FIG. 19 is an exemplary diagram illustrating a method of generating a lane in a map according to an exemplary embodiment of the present invention.
Figure 20:
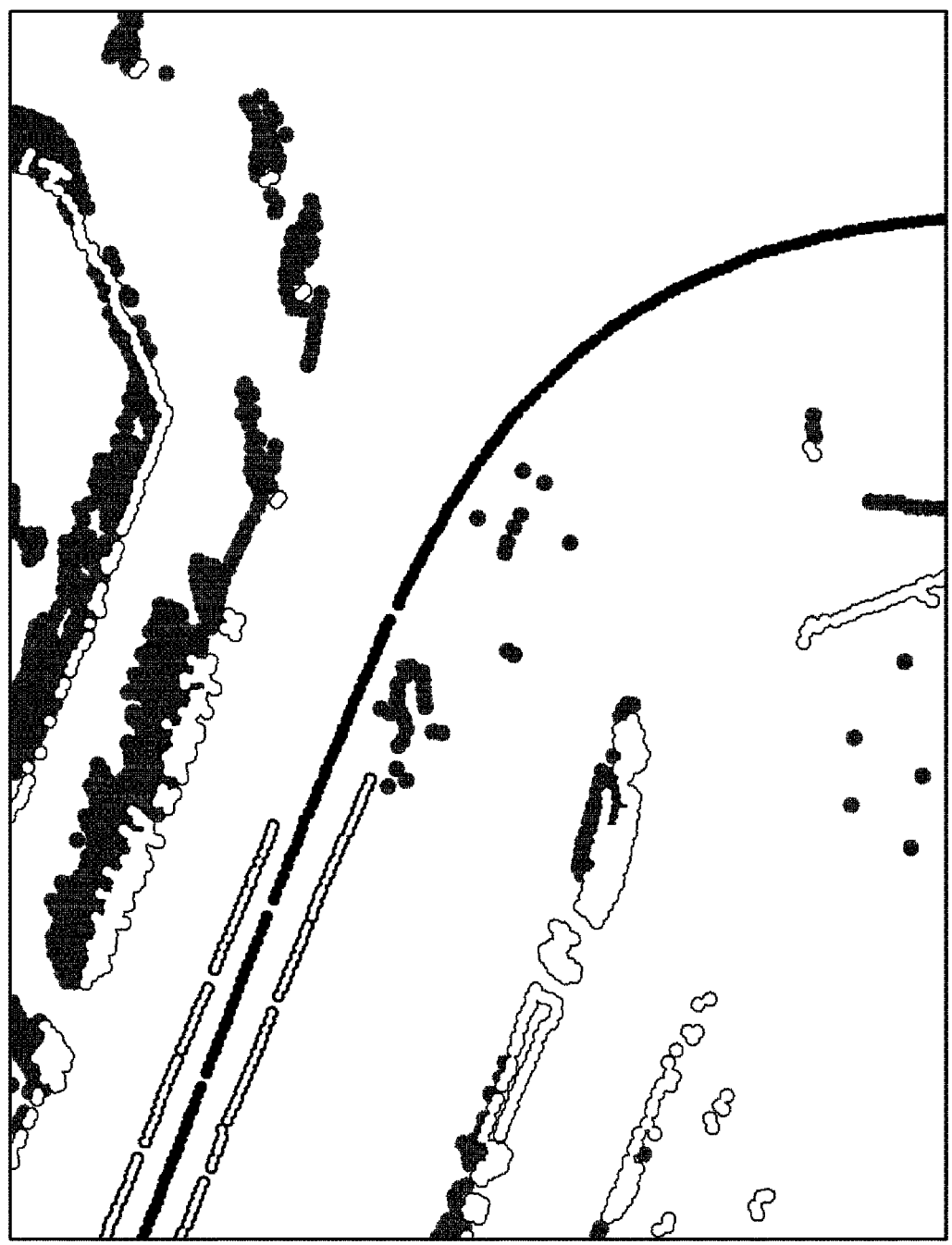
FIG. 20 is an exemplary diagram illustrating a method of generating a driving trajectory in a map according to an exemplary embodiment of the present invention.

FIG. 4, FIG. 5, FIG. 6, FIG. 7 and FIG. 8 are exemplary schematic diagrams illustrating a method of generating a map, FIG. 9, FIG. 10, FIG. 11, FIG. 12, FIG. 13, FIG. 14, FIG. 15, FIG. 16, FIG. 17, FIG. 18 are exemplary diagrams illustrating a method of generating a surrounding terrain in a map, FIG. 19 is an exemplary diagram illustrating a method of generating a lane in a map, and FIG. 20 is an exemplary diagram illustrating a method of generating a driving trajectory in a map.

Hereinafter, description of the present invention will be made with reference to FIG. 3 to FIG. 20.

Referring to FIG. 3, the vehicle 100 may include an inputter 110, a storage 120, a display 130, a communicator 140, a vehicle detector 150, and a controller 160.

In various exemplary embodiments, the inputter 110 includes hardware devices for the user input, such as buttons or switches, a pedal, a keyboard, a mouse, a track ball, various levers, a handle, and a stick.

In various exemplary embodiments, the inputter 110 also includes a Graphical User Interface (GUI), i.e., a software device, such as a touch pad for the user input. The touch pad is implemented with a touch screen panel (TSP), thus forming an interlayer structure with the display 130.

In various exemplary embodiments, the storage 120 stores a map. The storage 120 is not limited thereto, and in another exemplary embodiment stores various information related to the vehicle 100.

In various exemplary embodiments, the storage 120 is implemented with at least one of a non-volatile memory device, such as cache, read only memory (ROM), programmable ROM (PROM), erasable programmable ROM (EPROM), electrically erasable programmable ROM (EEPROM), a volatile memory device including random access memory (RAM), or a storage medium including hard disk drive (HDD) or compact disk (CD) ROM, but the implementation of the storage 120 is not limited thereto. In another exemplary embodiment, the storage 120 is a memory implemented with a chip separate from the above-described processor in relation to the controller 160, or in a further embodiment is implemented integrally with the processor in a single chip.

In various exemplary embodiments, the display 130 includes a Cathode Ray Tube (CRT), a Digital Light Processing (DLP) panel, a Plasma Display Panel (PDP), a Liquid Crystal Display (LCD) panel, an Electro Luminescence (EL) panel, an Electrophoretic Display (EPD) panel, an Electrochromic Display (ECD) panel, a Light Emitting Diode (LED) panel, an Organic Light Emitting Diode (OLED) panel, etc., but the implementation of the display is not limited thereto.

In various exemplary embodiments, the communicator 140 includes a or more components configured for facilitating communication with an external device. For example, the communicator 140 includes at least one of a short-range communication module, a wired communication module, and a wireless communication module.

In various exemplary embodiments, the short-range communication module includes various short-range communication modules including a Bluetooth module, an infrared communication module, a Radio Frequency Identification (RFID) communication module, a Wireless Local Access Network (WLAN) communication module, a Near Field Communication (NFC) module, a Zigbee communication module, and the like, which transmit and receive signals through a wireless communication network at a short range.

In various exemplary embodiments, the wired communication module includes various cable communication modules including a Universal Serial Bus (USB), a High Definition Multimedia Interface (HDMI), a Digital Visual Interface (DVI), Recommended Standard-232 (RS-232), power line communication, Plain Old Telephone Service (POTS), and the like, as well as various wired communication modules including a Controller Area Network (CAN) communication module, a Local Area Network (LAN) module, a Wide Area Network (WAN) module, a Value Added Network (VAN) module, and the like.

In various exemplary embodiments, the wireless communication module includes wireless communication modules supporting various wireless communication methods including Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), and the like, as well as a Radio Data System-Traffic Message Channel (RDS-TMS), Digital Multimedia Broadcasting (DMB), a Wireless-Fidelity (Wi-Fi) module, and a Wireless Broadband module.

In various exemplary embodiments, the wireless communication module may include a wireless communication interface including an antenna and a receiver to receive traffic information signals. In another exemplary embodiment, the wireless communication module includes a traffic-information signal conversion module to demodulate an analog radio signal received through the wireless communication interface into a digital control signal.

In various exemplary embodiments, the vehicle detector 150 is configured to detect driving environment information related to the surroundings of the vehicle. That is, the vehicle detector 150 detects the driving environment information of the surroundings of the vehicle 100.

In various exemplary embodiments, the vehicle detector 150 includes a Lidar detector, a camera, and a global positioning system (GPS) detector. However, the present invention is not limited thereto, and in other embodiments the vehicle detector 150 includes any detector that may detect the driving environment information of the surroundings of the vehicle 100.

In various exemplary embodiments, the controller 160 generates a map including at least one of a surrounding terrain, a lane, and a traveling route based on the detected driving environment information. That is, the controller 160 acquires LiDAR data, image data, and GPS data through the vehicle detector 150 to generate a map.

Figure 4:
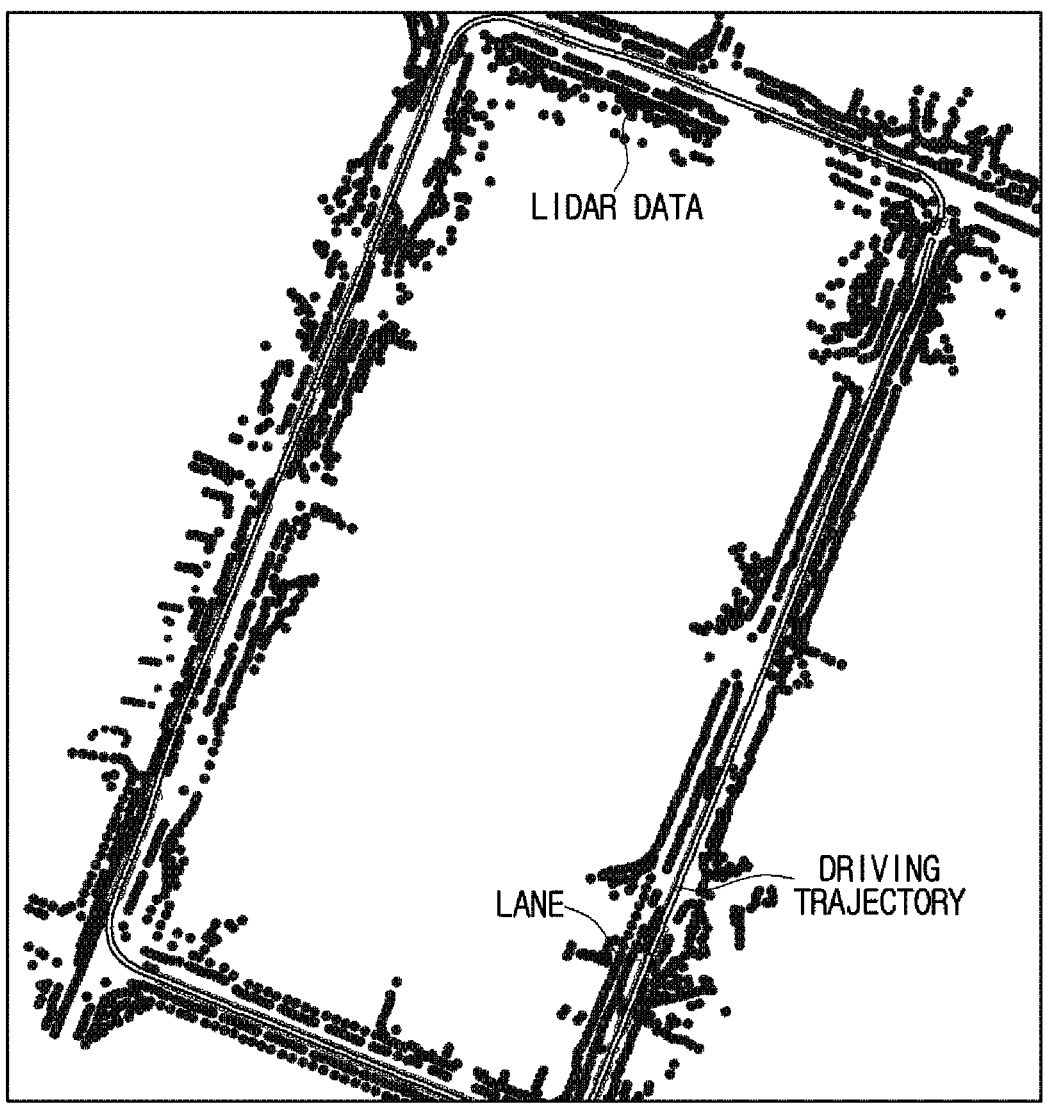
FIG. 4, FIG. 5, FIG. 6, FIG. 7 and FIG. 8 are schematic diagrams illustrating a method of generating a map according to an exemplary embodiment of the present invention.
Figure 5:
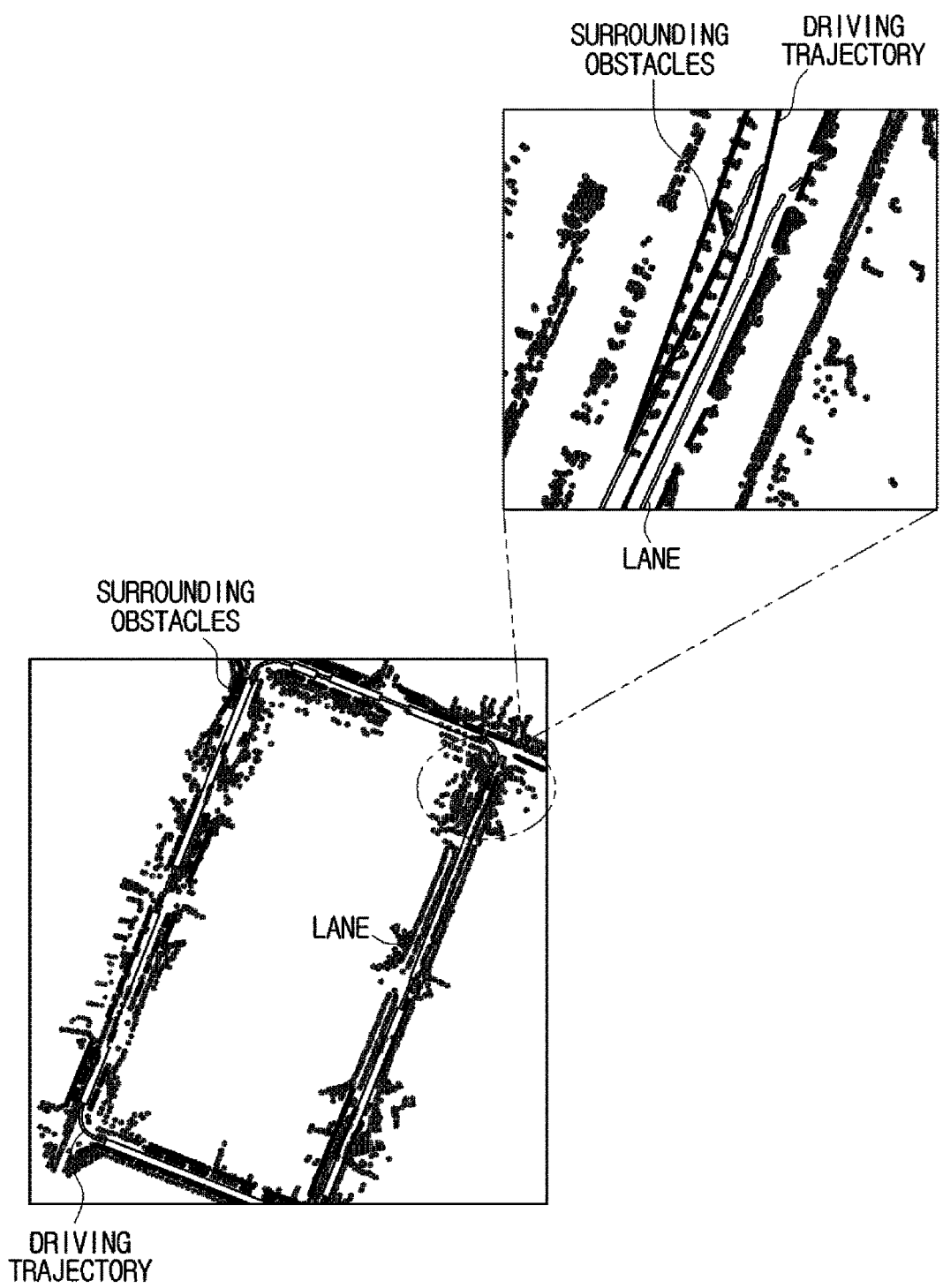

The controller 160, having obtained the detector data as shown in FIG. 4, automatically generates a map including a surrounding terrain, including a surrounding obstacle, a lane, and a driving trajectory from the obtained detector data as shown in FIG. 5. In various exemplary embodiments, the detector data includes LiDAR data indicating a lane and a driving trajectory as shown in FIG. 4, but the present invention is not limited thereto.

Figure 6:
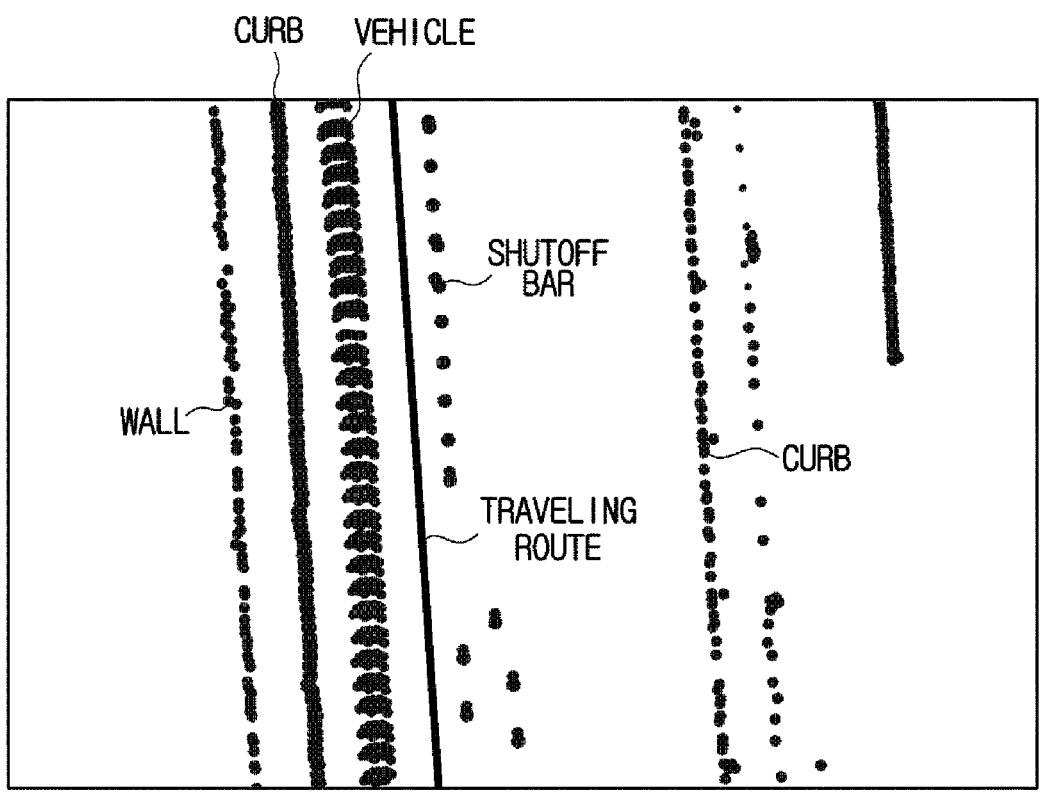
Figure 7:
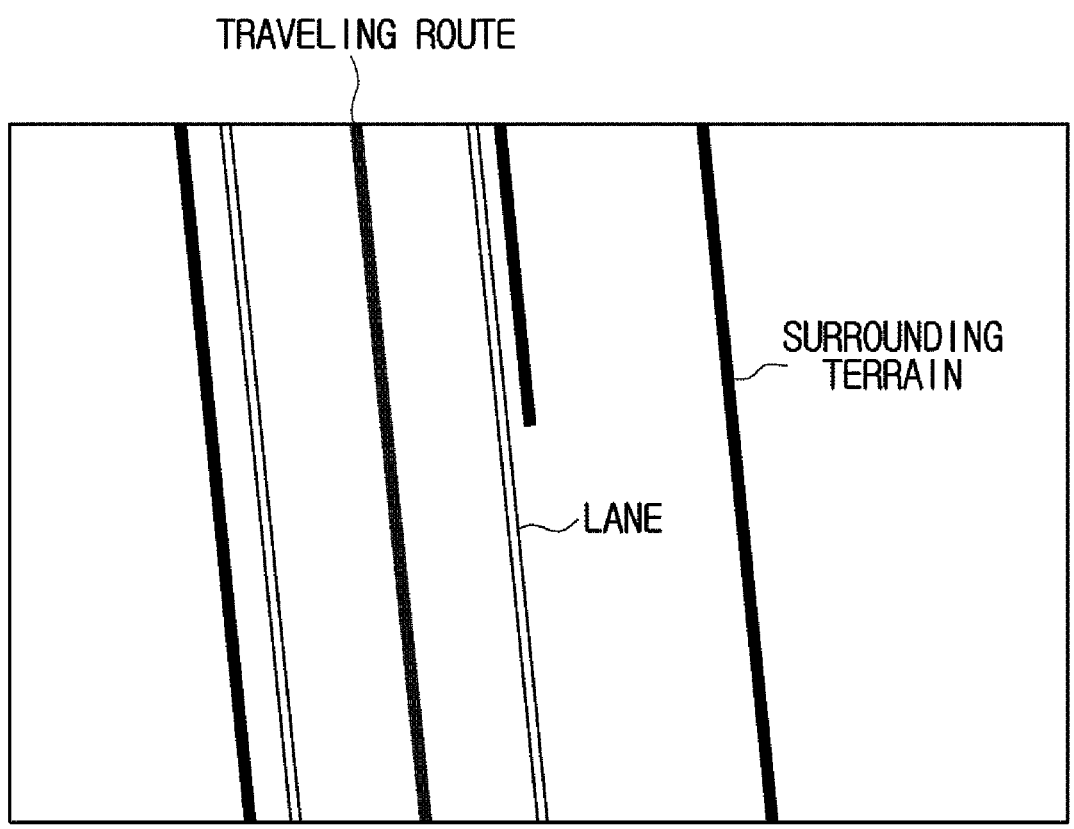

The controller 160 extracts a surrounding terrain, a lane, and a travel route from the driving environment information as shown in FIG. 6 including a wall, a curb, a vehicle, a traveling route, and a shutoff bar detected through the vehicle detector 150, to generate a map as shown in FIG. 7.

Figure 8:
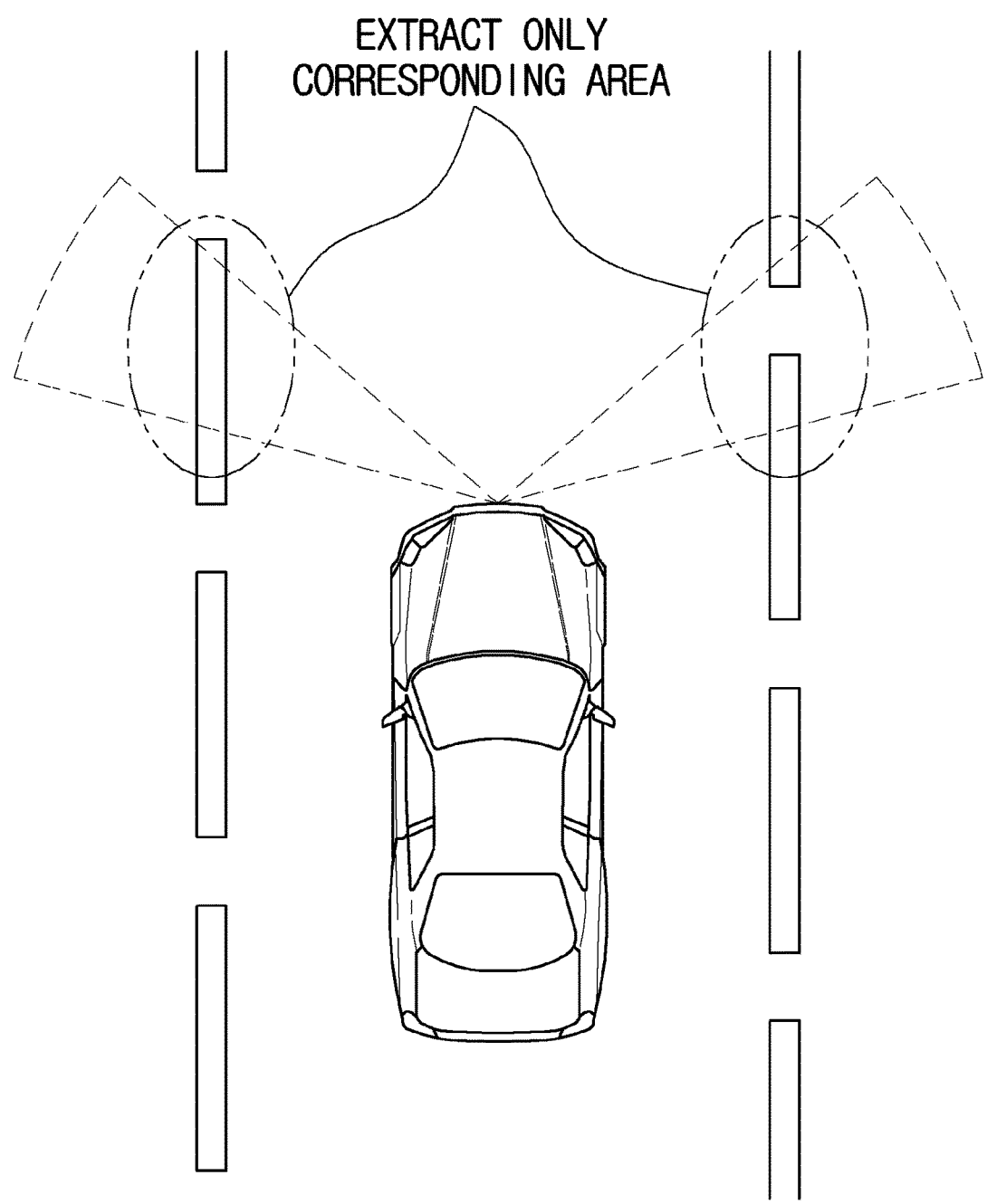

Referring to FIG. 8, the controller 160 uses the driving environment information corresponding to a predetermined distance and a predetermined range of angles with respect to the position of the vehicle among the driving environment information when generating the map.

The controller 160 sets a limitation of the predetermined distance since data from a large distance from the vehicle 100 has a large positional error due to a heading error. The controller 160 sets a limitation of predetermined angles since only obstacles adjacent to the left and right sides of the vehicle 100 are used for actual position determination.

The controller 160 extracts effective detector data from detector data detected through the vehicle detector 150 among the driving environment information, performs clustering on the extracted effective detector data to extract a line, and generates a surrounding terrain. In various exemplary embodiments, the vehicle detector 150 is a LiDAR detector, and the detector data is LiDAR data detected through a LiDAR detector.

Figure 9:
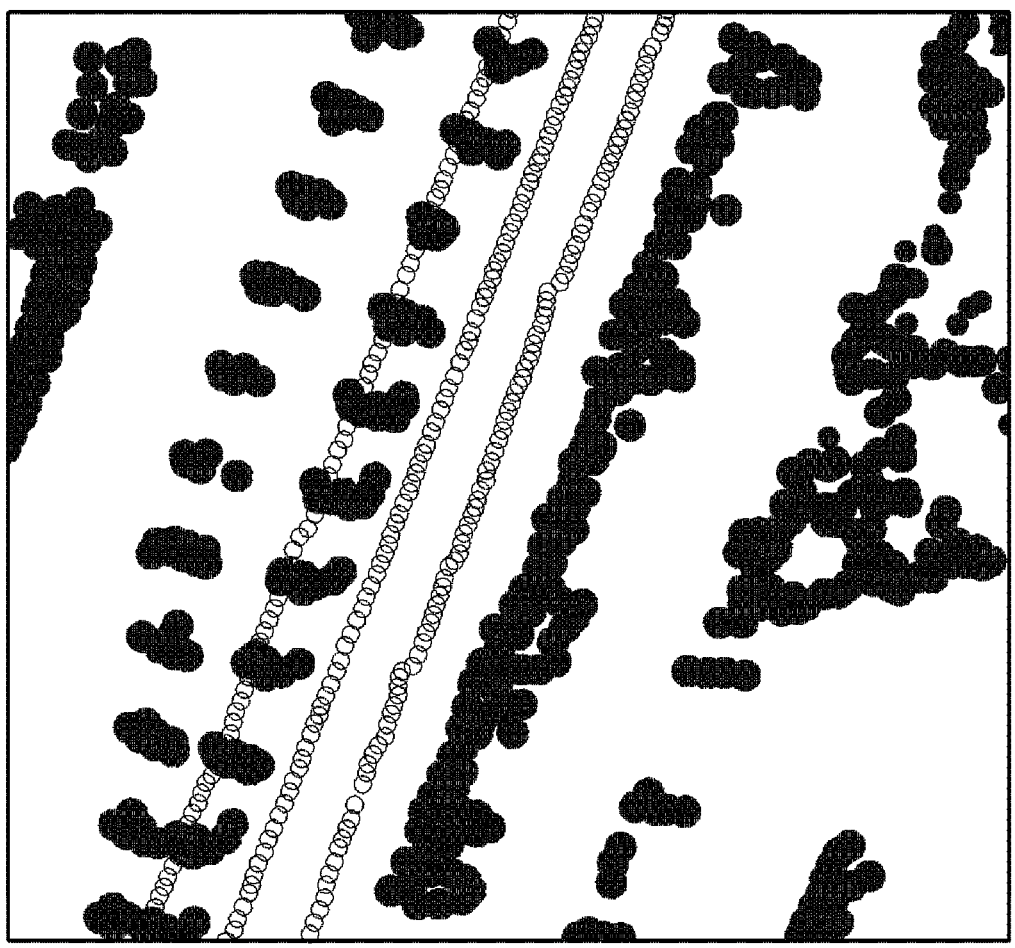
FIG. 9, FIG. 10, FIG. 11, FIG. 12, FIG. 13, FIG. 14, FIG. 15, FIG. 16, FIG. 17, FIG. 18 are exemplary diagrams illustrating a method of generating a surrounding terrain in a map according to an exemplary embodiment of the present invention.
Figure 10:
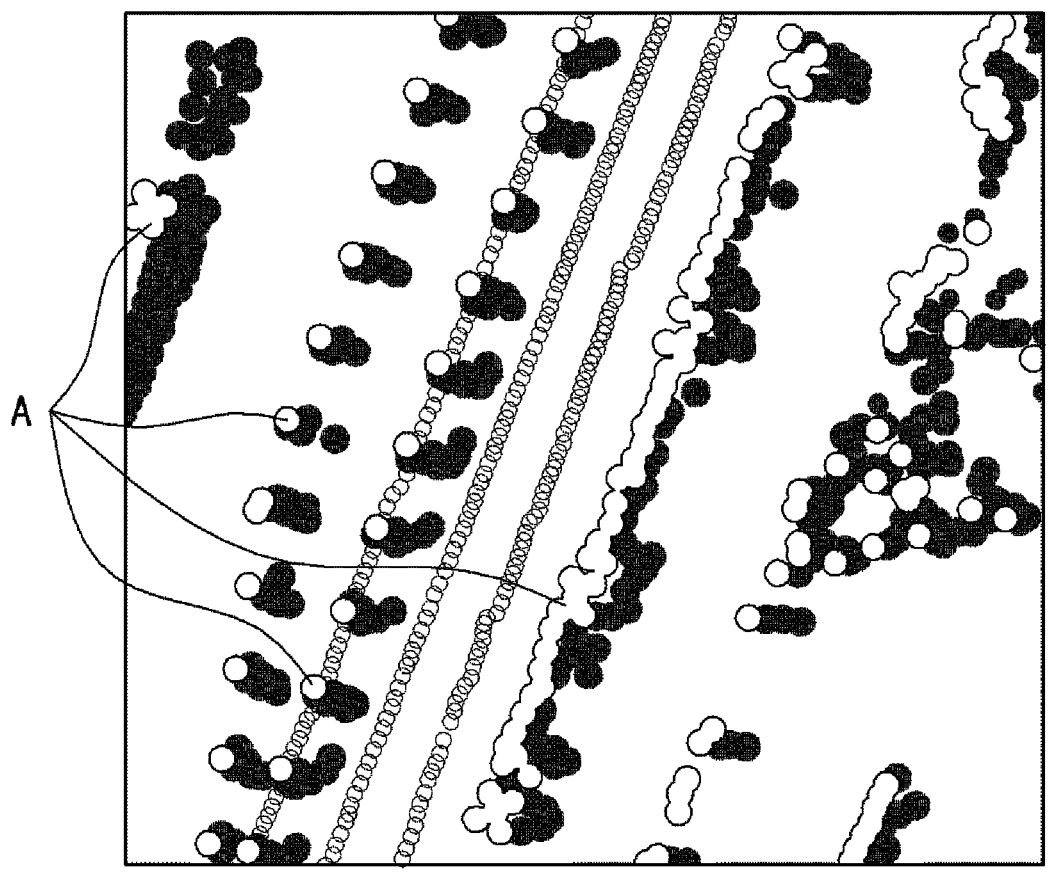
Figure 11:
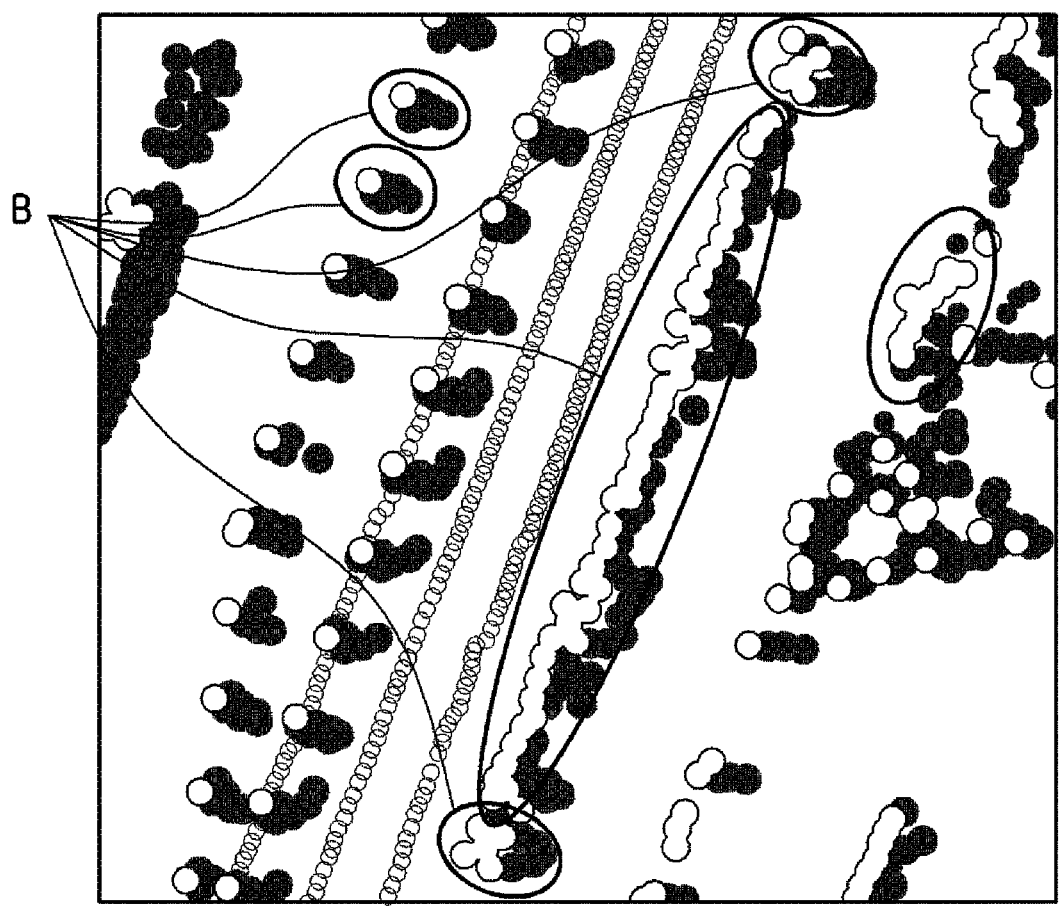
Figure 12:

Referring to FIG. 9 to FIG. 11, the controller 160 extracts effective LiDAR data (A in FIG. 10) from the LiDAR data shown in FIG. 9, and then clusters the effective LiDAR data (B in FIG. 11).

Figure 13:
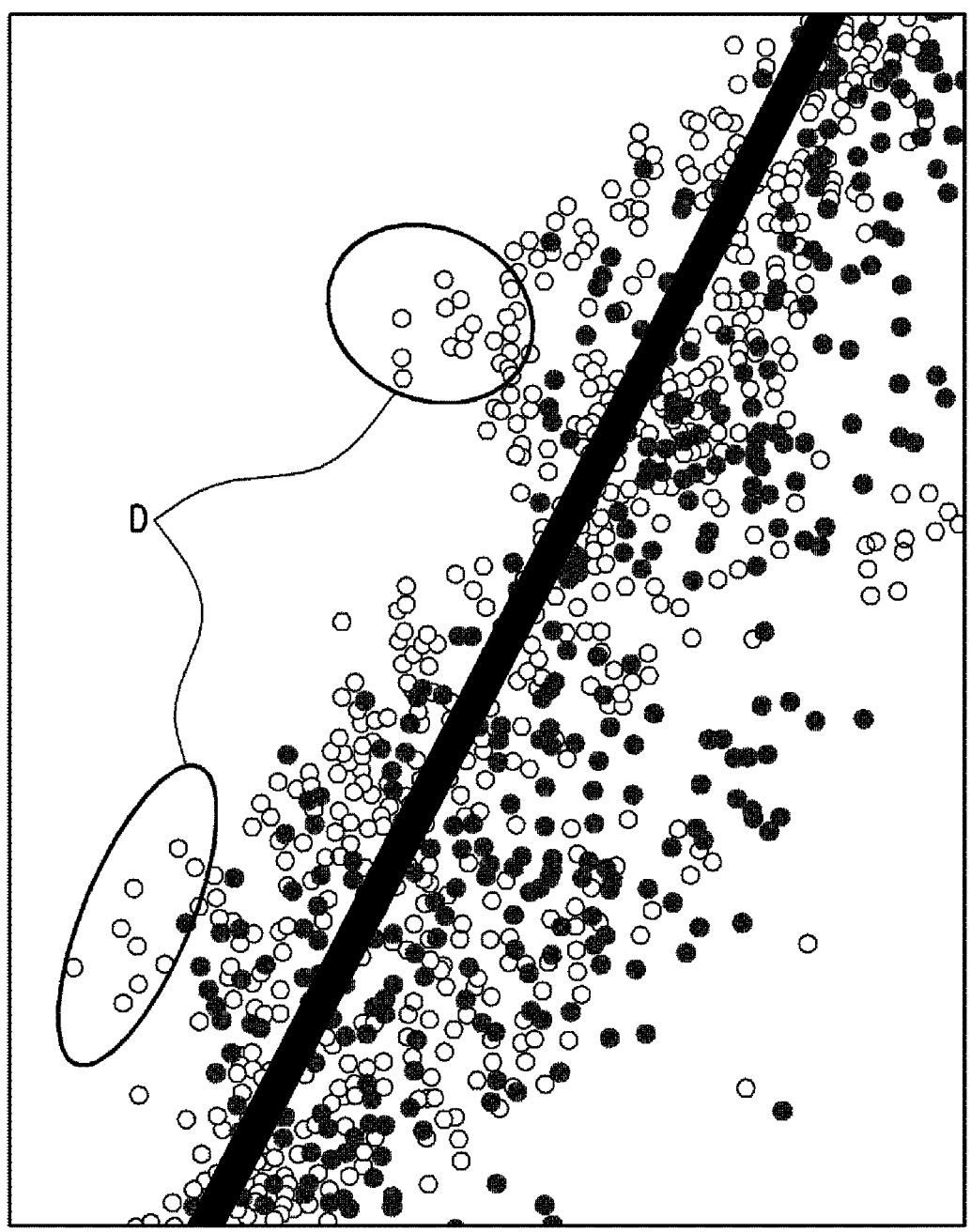
Figure 14:
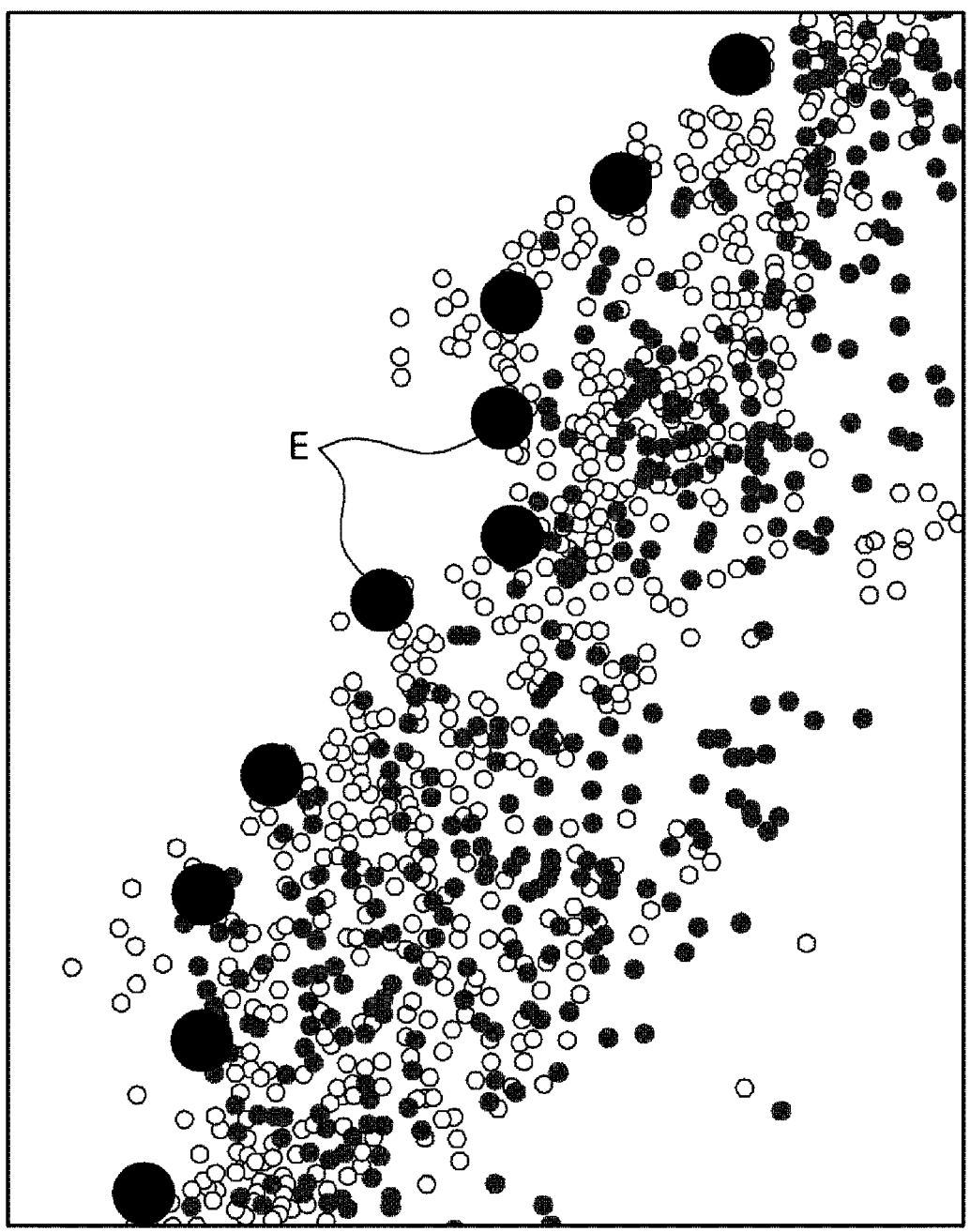
Figure 15:
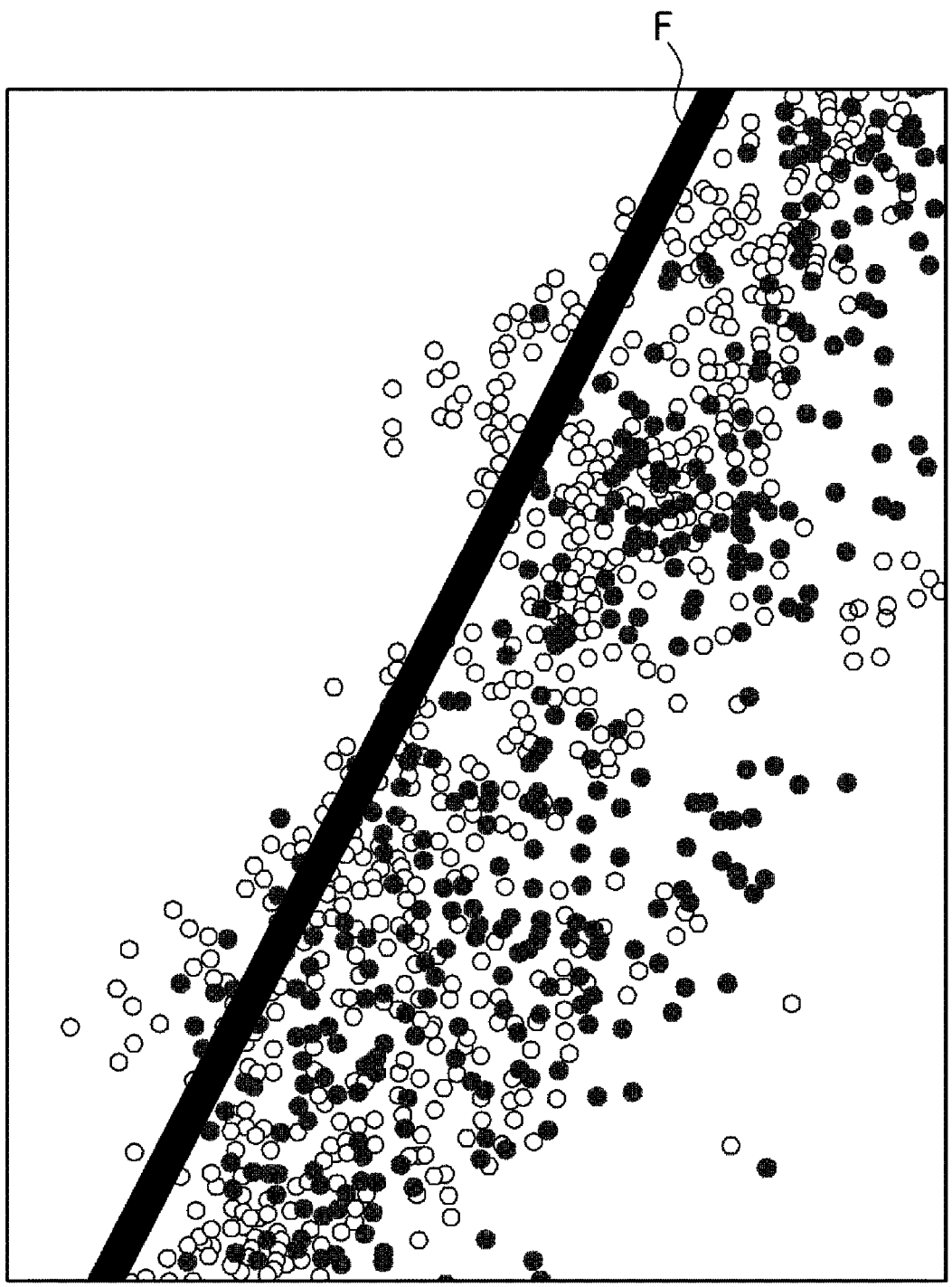

Referring to FIG. 12, FIG. 13, FIG. 14 and FIG. 15, the controller 160 extracts a straight line component by use of the least squares method (C in FIG. 12), and removes external points using the average distance and the deviation with respect to the straight line (D in FIG. 13). The controller 160 extracts a convex hull toward the driving trajectory (E in FIG. 14), and extracts a straight line by applying the least squares method to the convex hull to extract the main straight line (F in FIG. 15).

Figure 16:
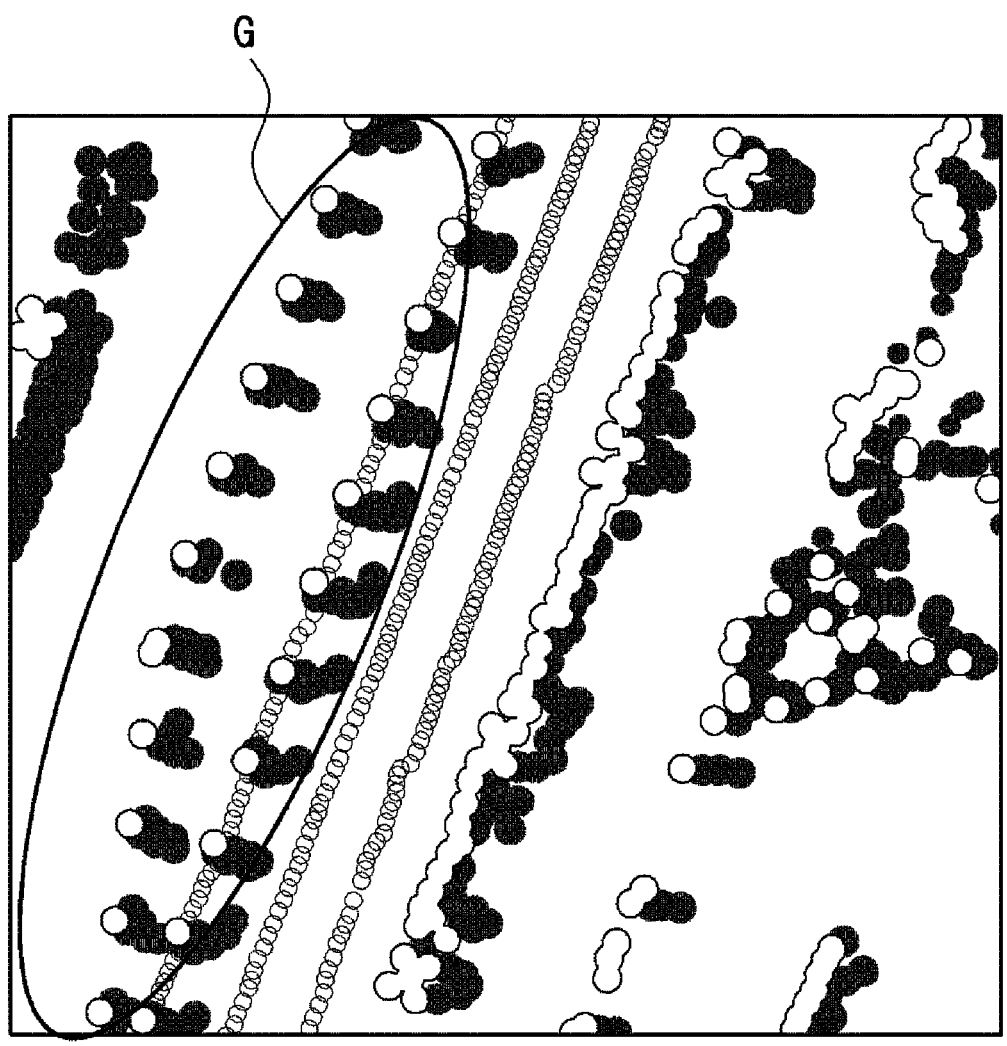

Referring to FIG. 16, FIG. 17, and FIG. 18, in various exemplary embodiments, the controller 160 extracts a subsidiary straight line connecting points adjacent to the main straight line.

The controller 160 extracts a point having an area smaller than a predetermined area (e.g., a point having a small area including a shutoff bar) (G in FIG. 16), performs clustering by use of the interval and the inclination of the points (H in FIG. 17), and then extracts the subsidiary straight line through the least squares method (I in FIG. 18).

The controller 160 divides portions using a curvature change based on a constant term (a distance value of a quadratic equation or cubic equation) and a vehicle driving trajectory that are detected from the driving environment information, and extracts a linear lane by use of a coefficient value of a linear term of the quadratic equation or cubic equation obtained by converting the vehicle driving trajectory of the vehicle of each portion into a quadratic curve. In various exemplary embodiments, the constant term of the quadratic equation or cubic equation detected from the driving environment information refers to a distance value of a quadratic equation or cubic equation detected from the driving environment information.

The controller 160 uses only a constant term in a quadratic equation (a curvature, a slope, a distance) (Equation 1) or a cubic equation, which is a general form of a lane extracted. Referring to FIG. 19, the constant term J may have a point shape.

$$y(\text{lane})=ax^2+bx+c \quad \text{[Equation 1]}$$

Here, (a) may refer to a curvature, (b) may refer to a slope, and (c) may refer to a distance (offset) between the vehicle 100 and an obstacle. In the present embodiment, the controller 160 uses only (c).

In various exemplary embodiments, the controller 160 divides the portions by use of a curvature change based on the travel trajectory K, and determine a coefficient value of a linear term (b in Equation 2) by fitting the driving trajectory (Equation 2) of each portion as a quadratic curve.

$$y(\text{driving trajectory})=ax^2+bx+c \quad \text{[Equation 2]}$$

In various exemplary embodiments, the controller 160 generates a lane in a form of a one-dimension straight line as shown in Equation 3 using the constant term and the coefficient value of the linear term.

$$y(\text{lane})=bx+c \quad \text{[Equation 3]}$$

The controller 160 rearranges the vehicle driving trajectory detected from the driving environment information at regular intervals to extract a driving trajectory. Since the speed of the vehicle at the time of detecting the driving environment information is reflected on the vehicle driving trajectory, the vehicle driving trajectory is redisposed at equal intervals to reflect a normal speed reference thereon.

The controller 160 generates a speed profile of a corresponding portion by use of an actual traveling speed of the vehicle.

Referring to FIG. 20, GPS positions varying according to the vehicle speed are redisposed at equal intervals from the driving environment information.

The controller 160 stores a map generated at each time of the vehicle travelling in the storage 120 as a temporary map, compares the temporary map with a current map presently applied to the vehicle, and updates the temporary map to a new current map when a difference between the temporary map and the current map exists.

In detail, the controller 160 updates the temporary map to the new current map when a number of times a main item of the temporary map is repeatedly measured is equal to or greater than a predetermined number of times and a difference between the temporary map and the current map exists, or when a difference between the temporary map and the current map exists in an area where an autonomous driving fails or a number of intervention times of a driver is equal to or greater than a reference value.

In various exemplary embodiments, when updating the temporary map to the new current map, the controller 160 assigns an identification number to the existing current map, and backs-up the existing current map in the storage 120. That is, the controller 160 assigns an identification number indicating a version, a back-up date, an order, etc. to a map to be backed-up, so that a restoration and retrieval of the map are facilitated later.

The controller 160 restores the current map to a most recent map among the maps backed-up in the storage 120 when an area in which an autonomous driving fails or a number of intervention occurrences of a driver is equal to or greater than a reference value is a map update zone.

The controller 160 determines that the current map is not correct when the autonomous driving fails or the intervention of the driver is repeated, and resumes the most recent map among the backed-up maps.

In various exemplary embodiments, the controller 160 includes a memory to store algorithms for controlling the operations of components of the vehicle 100 or data regarding programs for executing the algorithms, and a processor or to perform the above-described operation using the data stored in the memory. In various exemplary embodiments, the memory and the processor are implemented as separate chips, and in other embodiments the memory and the processor are implemented as a single chip.

Figure 21:
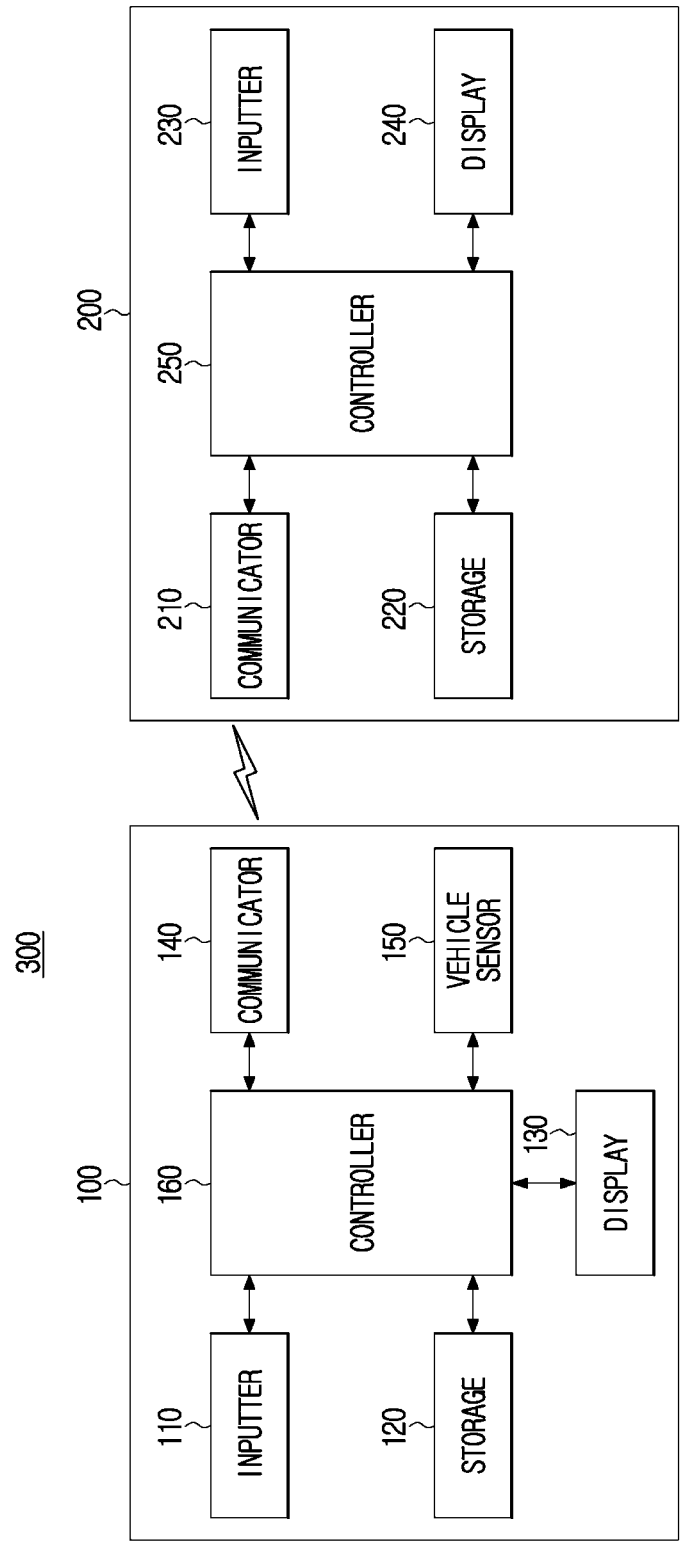
FIG. 21 is a control block diagram illustrating the configuration of an autonomous driving system in detail according to an exemplary embodiment of the present invention.

FIG. 21 is a control block diagram illustrating the configuration of an autonomous driving system in detail.

In the following description, details of members identical to those of the previous description of FIG. 3 will be omitted.

Referring to FIG. 21, an autonomous driving system 300 includes a vehicle 100 and an autonomous driving management server 200.

The vehicle 100 includes an inputter 110, a storage 120, a display 130, a communicator 140, a vehicle detector 150, and a controller 160. The inputter 110, the storage 120, the display 130, the communicator 140, and the vehicle detector 150 are the same as those in FIG. 3, and details thereof will be omitted.

The controller 160 detects driving environment information related to the surroundings of the vehicle through the vehicle detector 150, and generates a map including at least one of a surrounding terrain, a lane, and a traveling route based on the detected driving environment information.

In various exemplary embodiments, the controller 160 transmits the generated map to the autonomous driving management server 200.

In various exemplary embodiments, the controller 160 uses the driving environment information corresponding to a predetermined distance and a predetermined range of angles with respect to the position of the vehicle among the driving environment information when generating the map.

Referring to FIG. 21, the autonomous driving management server 200 includes a communicator 210 configured for communicating with the vehicle 100, a storage 220 configured for storing various pieces of information including a map transmitted from the vehicle 100, an inputter 230 configured for supporting a user's input, a display 240 configured for displaying various information related to the autonomous driving management server 200, and a controller 250 configured for storing and managing the map transmitted from the vehicle 100 in the storage 220.

The autonomous driving management server 200 stores the map transmitted from the vehicle 100 as a temporary map, compares the temporary map transmitted from the vehicle at each predetermined time interval of the vehicle travelling with the current map presently applied to the vehicle 100, and when a difference between the temporary map and the current map exists, transmits the temporary to the vehicle 100 for the temporary to be updated to a new current map.

In various exemplary embodiments, the autonomous driving management server 200 stores the map transmitted from the vehicle 100 together with the identification information of the vehicle 100.

The autonomous driving management server 200 updates the temporary map to the new current map when a number of times a main item of the temporary map is repeatedly measured is equal to or greater than a predetermined number of times and a difference between the temporary map and the current map exists, or when a difference between the temporary map and the current map exists in an area where an autonomous driving fails or a number of intervention times of a driver is equal to or greater than a reference value.

In various exemplary embodiments, the autonomous driving management server 200 transmits the most recent map among maps backed-up in the storage 220 to the vehicle 100 when an area in which an autonomous driving fails or a number of intervention times of a driver is equal to or greater than a reference value is a map update zone, so that the current map is restored to the most recent map. To the present end, the vehicle 100 transmits an autonomous driving failure notification or a driving intervention notification of the driver to the autonomous driving management server 200.

Figure 22:
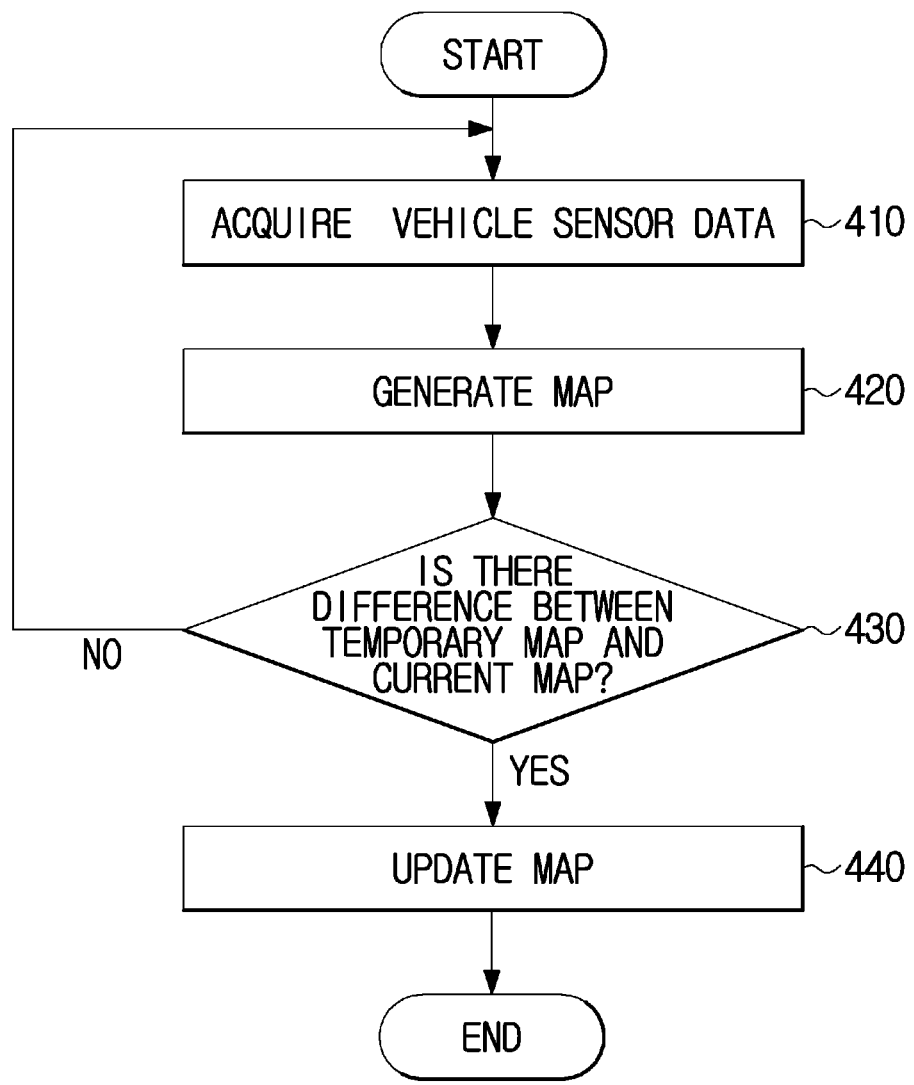
FIG. 22 is a flowchart showing a vehicle control method according to an exemplary embodiment of the present invention.
Figure 23:
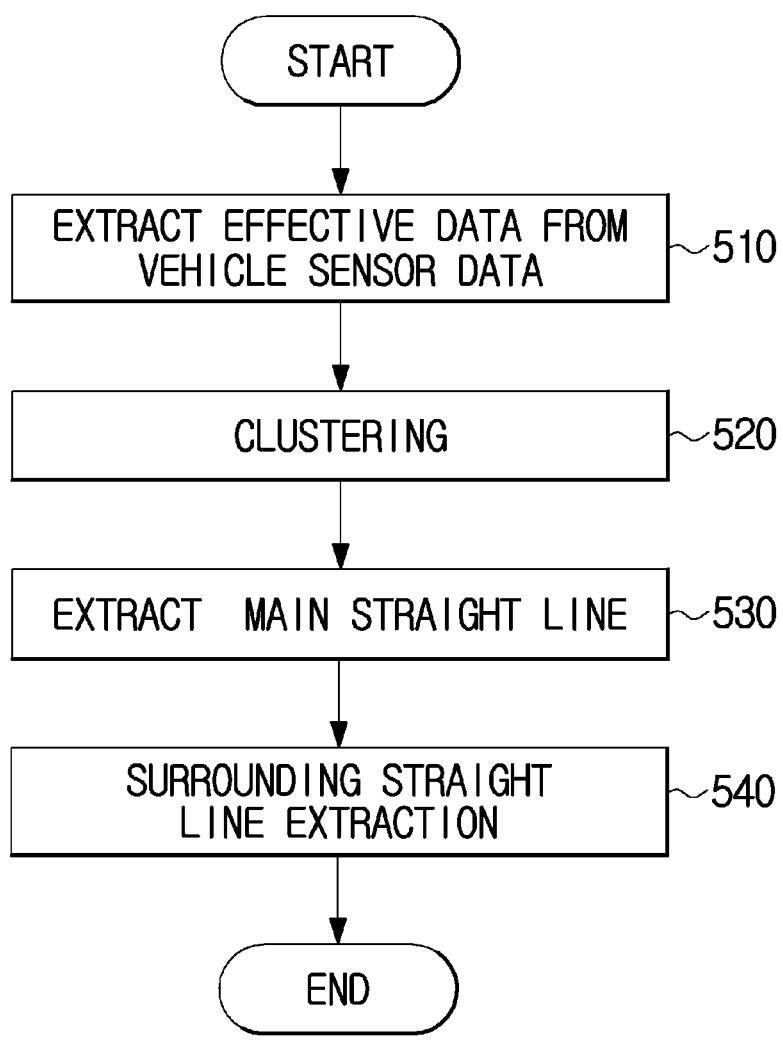
FIG. 23, FIG. 24 and FIG. 25 are flowcharts illustrating a portion of FIG. 22 in detail.
Figure 24:
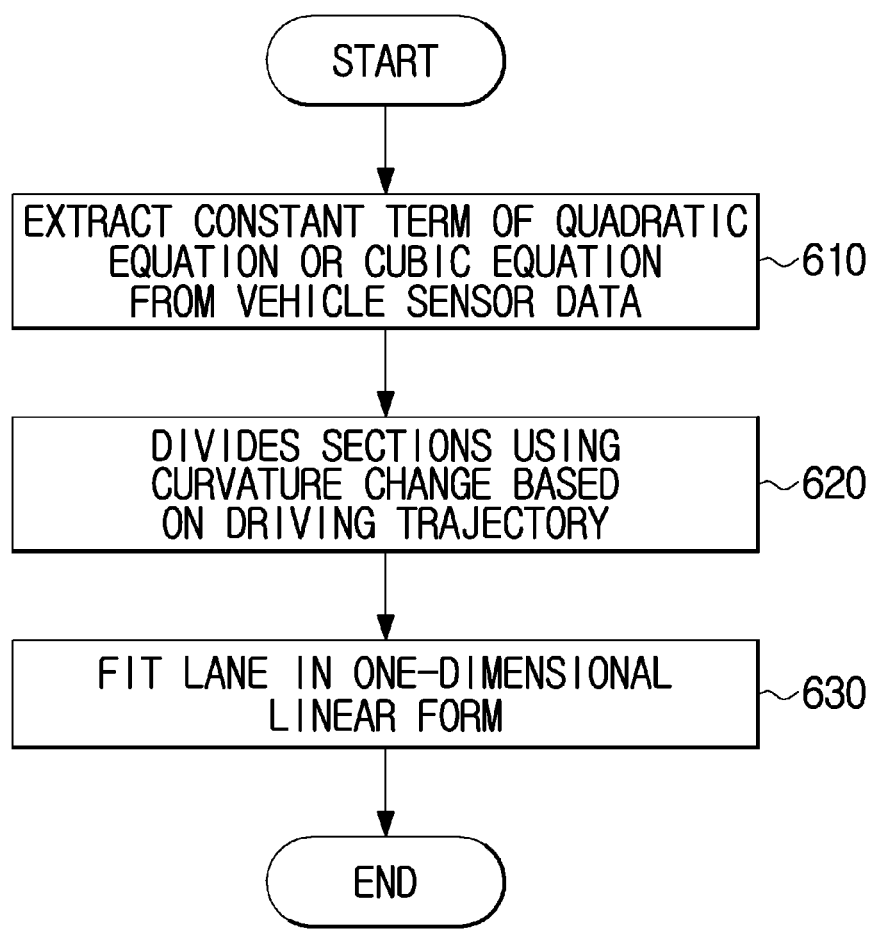
Figure 25:
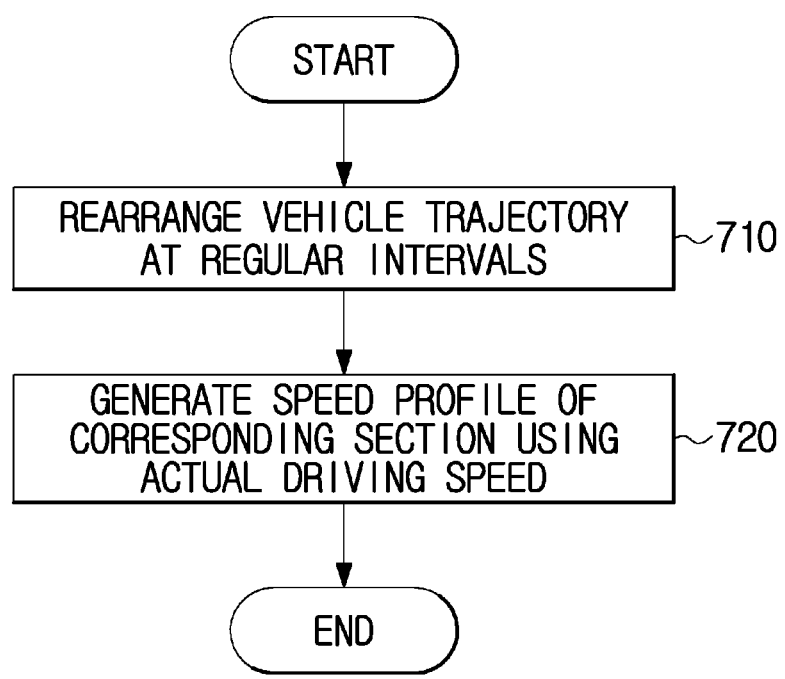

FIG. 22 is a flowchart showing a vehicle control method, and FIG. 23, FIG. 24 and FIG. 25 are flowcharts showing a portion of FIG. 22 in detail.

First, in various exemplary embodiments, the vehicle 100 detects driving environment information of surroundings of the vehicle through the vehicle detector 150 (410).

In various exemplary embodiments, the vehicle detector 150 includes a LiDAR detector, a camera, and a global positioning system (GPS) detector.

In various exemplary embodiments, the vehicle 100 generates a map including at least one of a surrounding terrain, a lane, and a traveling route based on the detected driving environment information, and store the generated map as a temporary map (420). Here, when generating the map, the vehicle 100 uses the driving environment information corresponding to a predetermined distance and a predetermined range of angles with respect to the position of the vehicle 100 among the driving environment information.

The method of the vehicle 100 generating the surrounding terrain, the lane, and the traveling route is referred to as follows.

Referring to FIG. 23, the vehicle 100 extracts effective detector data from detector data detected through the vehicle detector 150 among the driving environment information (510).

The vehicle 100 clusters the extracted effective detector data (520) and extracts a main straight line from the clustered effective detector data (530).

The vehicle 100 generates a surrounding terrain by extracting a surrounding straight line adjacent to the main straight line (540).

Referring to FIG. 24, in various exemplary embodiments, the vehicle 100 extracts a constant term of a quadratic equation or cubic equation that is detected from the driving environment information (610). In various exemplary embodiments, the constant term of the quadratic equation or cubic equation detected from the driving environment information refers to a distance value of the quadratic equation or cubic equation detected from the driving environment information.

In various exemplary embodiments, the vehicle 100 divides portions using a curvature change based on a driving trajectory of the vehicle, and extracts a coefficient value of a linear term of the quadratic equation or cubic equation by converting the driving trajectory of the vehicle of each portion into a quadratic curve (620).

The vehicle 100 generates a linear lane using the constant term and the coefficient value of a linear term of the quadratic equation or cubic equation (630).

Referring to FIG. 25, in various exemplary embodiments, the vehicle 100 extracts a driving trajectory by rearranging the driving trajectory of the vehicle detected from the driving environment information at regular intervals (710).

In various exemplary embodiments, the vehicle 100 generates a speed profile of a corresponding portion using an actual traveling speed (720).

In various exemplary embodiments, the vehicle 100 compares a temporary map with a current map presently applied to the vehicle 100 (430).

When it is determined, as a result of the comparison, that a difference between the temporary map and the current map exists, the vehicle 100 updates the temporary map to a new current map (440).

The vehicle 100 updates the temporary map to the new current map when a number of times a main item of the temporary map is repeatedly measured is equal to or greater than a predetermined number of times and a difference between the temporary map and the current map exists, or when a difference between the temporary map and the current map exists in an area where an autonomous driving fails or a number of intervention times of a driver is equal to or greater than a reference value.

In various exemplary embodiments, when updating the temporary map to the new current map, the vehicle 100 assigns an identification number to the existing current map, and backs-up the existing current map in the storage 120. Although not shown, in various exemplary embodiments, after operation 440 the vehicle 100 restores the current map to a most recent map among the backed-up maps when an area in which an autonomous driving fails or a number of intervention times of a driver is equal to or greater than a reference value is a map update zone. Meanwhile, the above-described embodiments may be embodied in a form of a recording medium that stores commands executable by a computer. In other embodiments, the commands are stored in a form of program codes, and when executed by a processor, the commands generate a program module to perform the operations of the above-described embodiments. In various exemplary embodiments, the recording medium is embodied as computer-readable recording medium.

The computer-readable recording medium includes all kinds of recording medium that store commands interpretable by a computer. For example, in various exemplary embodiments, the computer-readable recording medium is Read Only Memory (ROM), Random Access Memory (RAM), a magnetic tape, a magnetic tape, a magnetic disk, a flash memory, or an optical data storage device.

As is apparent from the above, the autonomous vehicle automatically generates and updates map data corresponding to a portion in which the autonomous vehicle travels, so that a map reflecting the detector characteristics of the vehicle can be generated. In addition, the map generated at the time of autonomous driving is used, so that the accuracy in recognizing the position of the vehicle and the surrounding traffic environment can be improved.

A map is produced by use of the autonomous driving vehicle, so that additional equipment is not required. The map is automatically generated, shortening the time taken to produce the map.

The map is maintained in an up-to-date state by reflecting the most recent driving environment through real-time updating of the map.

For convenience in explanation and accurate definition in the appended claims, the terms "upper", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures. The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle comprising:
    a vehicle detector configured to detect driving environment information about surroundings of the vehicle;
    a controller configured to generate a map including at least one of a surrounding terrain, a lane, and a traveling route based on the detected driving environment information; and
    a storage configured to store the map,
    wherein the controller is configured to store the map generated at each driving of the vehicle in the storage as a temporary map, to compare the temporary map with a current map presently applied to the vehicle,
    wherein the controller is configured to update the temporary man to a new current map when a difference between the temporary map and the current map exists,
    wherein when the temporary map is updated to the new current map, the controller is configured to assign an identification number to an existing current map, and back up the existing current map in the storage, and
    wherein the controller is configured to restore the current map to a most recent map among maps backed up in the storage when a predetermined area in which an autonomous driving fails or a number of intervention times of a driver is equal to or greater than a reference value is a map update zone.

2. The vehicle according to claim 1, wherein the controller is configured to generate the surrounding terrain by extracting predetermined data from data detected through the vehicle detector among the driving environment information, clustering the extracted data, and extracting a line.

3. The vehicle according to claim 1, wherein the controller is configured to extract a linear lane by dividing portions using a curvature change based on a constant term of a quadratic equation or cubic equation and a vehicle driving trajectory detected from the driving environment information, and using a coefficient value of a linear term of the quadratic equation or cubic equation obtained by converting the vehicle driving trajectory of each portion into a quadratic curve,
    wherein the each portion is a portion between portions where the curvature changes.

4. The vehicle according to claim 1, wherein the controller is configured to extract a driving trajectory by rearranging the vehicle driving trajectory detected from the driving environment information at predetermined intervals.

5. The vehicle according to claim 1, wherein, when the map is generated, the controller is configured to use driving environment information corresponding to a predetermined distance and a predetermined range of angles with respect to a position of the vehicle among the driving environment information.

6. The vehicle according to claim 1, wherein the controller is configured to update the temporary map to the new current map when a number of times a main item of the temporary map is repeatedly measured is equal to or greater than a predetermined number of times and a difference between the temporary map and the current map exists, or when a difference between the temporary map and the current map exists in a predetermined area where an autonomous driving fails or a number of intervention times of a driver is equal to or greater than a reference value.

7. The vehicle according to claim 1, wherein the vehicle detector includes a LiDAR detector, a camera, and a global positioning system (GPS) detector.

8. A control method of controlling a vehicle, the method comprising:
  detecting driving environment information about surroundings of the vehicle through a vehicle detector,
  generating a map including at least one of a surrounding terrain, a lane and a traveling route based on the detected driving environment information, and storing the generated map as a temporary map;
  comparing the temporary map with a current map presently applied to the vehicle;
  updating the temporary map to a new current map when a number of times a main item of the temporary map is repeatedly measured is equal to or greater than a predetermined number of times and a difference between the temporary map and the current map exists, or when a difference between the temporary map and the current man exists in a predetermined area where an autonomous driving fails or a number of intervention times of a driver is equal to or greater than a reference value;
  assigning an identification number to an existing current map, and backing up the existing current map; and
  after the updating of the temporary map to the new current map, restoring the current map to a most recent map among the backed-up maps when the predetermined area in which the autonomous driving fails or the number of intervention times of the driver is equal to or greater than the reference value is a map update zone.

9. The method according to claim 8, wherein the generating and storing of the map includes:
  extracting predetermined data from data detected through the vehicle detector among the driving environment information;
  clustering the extracted data;
  extracting a main straight line from the clustered data; and
  generating the surrounding terrain by extracting a surrounding line adjacent to the main straight line.

10. The method according to claim 8, wherein the generating and storing of the map includes:
  extracting a constant term of a quadratic equation or cubic equation detected from the driving environment information;
  dividing portions by use of a curvature change based on a vehicle driving trajectory, and extracting a coefficient value of a linear term of the quadratic equation or cubic equation obtained by converting the vehicle driving trajectory of each portion into a quadratic curve; and
  generating a linear lane by use of the constant term and the coefficient value of the linear term,
  wherein the each portion is a portion between portions where the curvature changes.

11. The method according to claim 8, wherein the generating and storing of the map includes extracting a driving trajectory by rearranging a vehicle driving trajectory detected from the driving environment information at predetermined intervals.

12. The method according to claim 8, wherein the map is generated using driving environment information corresponding to a predetermined distance and a predetermined range of angles with respect to a position of the vehicle among the driving environment information.

13. An autonomous driving system comprising:
  a vehicle configured to detect driving environment information about surroundings of the vehicle through a vehicle detector and generate a map including at least one of a surrounding terrain, a lane, and a traveling route based on the detected driving environment information; and
  an autonomous driving management server configured to store the map transmitted from the vehicle as a temporary map, compare the temporary map transmitted from the vehicle with a current map presently applied to the vehicle at each time of the vehicle travelling, and when a difference between the temporary map and the current map exists, transmit the temporary map to the vehicle for the temporary map to be updated to a new current map,
  wherein the vehicle is configured to update the temporary map to a new current map when a difference between the temporary map and the current map exists,
  wherein when the temporary map is updated to the new current map, the vehicle is configured to assign an identification number to an existing current map, and back up the existing current map in a storage, and
  wherein the vehicle is configured to restore the current map to a most recent man among the maps backed up in the storage when a predetermined area in which an autonomous driving fails or a number of intervention times of a driver is equal to or greater than a reference value is a map update zone.

14. The autonomous driving system according to claim 13, wherein the autonomous driving management server is configured to update the temporary map to the new current map when a number of times a main item of the temporary map is repeatedly measured is equal to or greater than a predetermined number of times and a difference between the temporary map and the current map exists, or when a difference between the temporary map and the current map exists in the predetermined area where the autonomous driving fails or the number of intervention times of the driver is equal to or greater than the reference value.

* * * * *